United States Patent [19]

Nierenberg et al.

[11] Patent Number: 5,664,182

[45] Date of Patent: Sep. 2, 1997

[54] PERSISTENT STORAGE OF REPORT OBJECTS

[75] Inventors: Nicolas C. Nierenberg, Hillsborough; Paul A. Rogers, Newark; David B. Edwards, Half Moon Bay; John R. Dafoe, Benicia; William A. Osberg, San Mateo, all of Calif.

[73] Assignee: Actuate Software Corporation, San Mateo, Calif.

[21] Appl. No.: 528,995

[22] Filed: Sep. 18, 1995

[51] Int. Cl.$^6$ .................................................. G06F 17/30
[52] U.S. Cl. ........................ 395/613; 395/611; 395/612; 395/614
[58] Field of Search .................................. 395/611, 612, 395/613, 614, 615, 201, 202, 203, 204, 205, 206, 207, 208, 209, 210, 235, 704, 705, 800, 683

[56] References Cited

U.S. PATENT DOCUMENTS

| | | | |
|---|---|---|---|
| 5,491,796 | 2/1996 | Wanderer et al. | 395/200.09 |
| 5,523,942 | 6/1996 | Tyler et al. | 395/204 |
| 5,574,898 | 11/1996 | Leblang et al. | 395/601 |
| 5,579,519 | 11/1996 | Pelletier et al. | 395/705 |
| 5,586,255 | 12/1996 | Tanaka et al. | 395/200.01 |

OTHER PUBLICATIONS

Product Brochure for "Adobe Acrobat" available from Adobe Systems, Incorporated, 1994.
Product Brochure for "Crystal Reports" available from Crystal Computer Services, Inc. no date.
Release regarding "Crystal Info" application available from Crystal Computer Services, Inc., 1995.
Product Brochure for "Crystal Reports Server" available from Crystal Services, 1994.
Product Brochure for "Business Objects" available from Business Objects, Incorporated, 1993.
Product Brochure for "IQ Intelligent Query" available from IQ Software Corporation, 1994.

*Primary Examiner*—Thomas G. Black
*Assistant Examiner*—Ruay Lian Ho
*Attorney, Agent, or Firm*—Hickman Beyer & Weaver

[57] ABSTRACT

A method is disclosed for persistently storing in an object-oriented format various pieces of information required to display and search a report. The information is stored in a logical hierarchy including multiple "level break" objects at a first level. Similar level break objects may be provided at a second level of the hierarchy, and at a third level, etc. Level breaks represent divisions between parallel report entities, and the level breaks at a "first level" divide report entities which can not be further segregated into discrete groups. In general, the objects representing level breaks include general information about an entity such as the entity's name and location, or report totals associated with that entity. In the hierarchy, each level break object at the first level may reference one or more level break objects at the second level, and, in addition, may reference objects representing the visual regions (or "frames") in which report information pertaining to the first level entity is displayed. The frame objects, in turn, each contain various "control objects" which describe the formatting, size, and other associated information pertaining to the display of frames.

36 Claims, 15 Drawing Sheets

Microfiche Appendix Included
(2 Microfiche, 164 Pages)

CUSTOMER A
1000 Market Square
Strasburg, PA 17579

Order 1 — October 15, 1995

| Category | Code | Description | Quantity | Price | Extension |
|---|---|---|---|---|---|
| Processor | MP1632x | 32 bit Programmable Cont. | 668 | $221 | $147,628 |
| DRAM | MR0840 | 8M x 4 DRAM | 672 | $15 | $10,080 |
| DRAM | MRL0140 | 4M x 1 DRAM | 668 | $8 | $5,344 |
| SRAM | MS3210 | 32M x 1 SRAM | 657 | $65 | $42,705 |
| | | Totals | 2665 | | $205,757 |

Order 2 — December 22, 1995

| Category | Code | Description | Quantity | Price | Extension |
|---|---|---|---|---|---|
| DRAM | MRL3240 | 32M x 4 DRAM 3.3 V | 654 | $61 | $39,894 |
| DRAM | MRL3210 | 32M x 1 DRAM 3.3 V | 658 | $52 | $34,216 |
| | | Totals | 13,312 | | $74,110 |

Order 3 — May 19, 1996

| Category | Code | Description | Quantity | Price | Extension |
|---|---|---|---|---|---|
| DRAM | MRL3210 | 32M x 1 DRAM 3.3 V | 726 | $52 | $37,752 |
| SRAM | MS3240 | 32M x 4 SRAM | 590 | $77 | $45,430 |
| Processor | MP1632x | 32 bit Programmable Cont. | 655 | $221 | $144,755 |
| DRAM | MRL0140 | 4M x 1 DRAM, 3.3 V | 635 | $8 | $5080 |
| SRAM | MS3210 | 32M x 1 SRAM | 555 | $65 | $36,075 |
| | | Totals | 3161 | | $269,092 |
| | | | | | $548,959 |

CUSTOMER B
4057 Harrison Street
Oakland, CA 94602

Order 1 — November 5, 1995

| Category | Code | Description | Quantity | Price | Extension |
|---|---|---|---|---|---|
| DRAM | MR0840 | 8M x 4 DRAM | 644 | $15 | $9,660 |
| SRAM | MS3210 | 32M x 1 SRAM | 680 | $65 | $44,200 |
| SRAM | MSL0890 | 8M x 9 SRAM, 3.3 V | 665 | $165 | $109,725 |
| SRAM | MSL3210 | 32M x 1 SRAM, 3.3 V | 669 | $130 | $86,970 |
| Graphics | MV1664 | 64 bit Programmable Video Graphics Driver | 655 | $320 | $209,600 |
| | | Totals | 3313 | | $460,155 |

FIG. 2A

CUSTOMER B
4057 Harrison Street
Oakland, CA 94602

Order 2 — March 15, 1996

| Category | Code | Description | Quantity | Price | Extension |
|---|---|---|---|---|---|
| Processor | MP1632x | 32 bit Programmable Cont. | 655 | $221 | $144,755 |
| DRAM | MRL3210 | 32M x 1 DRAM 3.3 V | 631 | $52 | $32,812 |
| DRAM | MRL0140 | 4M x 1 DRAM, 3.3 V | 495 | $8 | $3,960 |
| SRAM | MS3210 | 32M x 1 SRAM | 698 | $65 | $45,370 |
| SRAM | MS3210 | 32M x 1 SRAM | 459 | $65 | $29,835 |
| | | Totals | 2,938 | | $256,732 |

Order 3 — May 23, 1996

| Category | Code | Description | Quantity | Price | Extension |
|---|---|---|---|---|---|
| DRAM | MRL3240 | 32M x 4 DRAM 3.3 V | 444 | $61 | $27,084 |
| Graphics | MV1664 | 64 bit Programmable Video Graphics Driver | 345 | $320 | $110,400 |
| | | Totals | 789 | | $137,484 |
| | | | | | $854,371 |

CUSTOMER C
1999 Las Positas Road
Livermore, CA 94553

Order 1 — November 1, 1995

| Category | Code | Description | Quantity | Price | Extension |
|---|---|---|---|---|---|
| DRAM | MR0840 | 8M x 4 DRAM | 698 | $15 | $10,470 |
| DRAM | MRL3240 | 32M x 4 DRAM 3.3 V | 377 | $61 | $22,997 |
| DRAM | MRL0140 | 4M x 1 DRAM, 3.3 V | 924 | $8 | $7,392 |
| SRAM | MSL0890 | 8M x 9 SRAM, 3.3 V | 559 | $165 | $92,235 |
| SRAM | MSL3210 | 32M x 1 SRAM, 3.3 V | 206 | $130 | $26,780 |
| | | Totals | 3326 | | $159,874 |

Order 2 — December 19, 1995

| Category | Code | Description | Quantity | Price | Extension |
|---|---|---|---|---|---|
| DRAM | MRL3210 | 32M x 1 DRAM 3.3 V | 833 | $52 | $43,316 |
| DRAM | MRL0140 | 4M x 1 DRAM, 3.3 V | 800 | $8 | $6,400 |
| SRAM | MS3210 | 32M x 1 SRAM | 696 | $65 | $45,240 |
| | | Totals | 2,329 | | $94,956 |
| | | | | | $254,830 |

FIG. 2B

PERSISTENT STORAGE OF REPORT OBJECTS

COPYRIGHT NOTICE

A portion of the disclosure of this patent document contains material which is subject to copyright protection. The copyright owner has no objection to the reproduction by anyone of the patent document or the patent disclosure as it appears in the Patent and Trademark Office patent file or records, but otherwise reserves all copyright rights.

MICROFICHE APPENDIX

Included is microfiche appendix A, including 2 sheets having 164 total frames.

BACKGROUND OF THE INVENTION

The present invention relates to computer-implemented systems and methods for generating highly formatted searchable reports. More specifically, the invention relates to systems and methods for generating and storing such reports as persistent objects.

Business professionals often deal with large mounts of data in the form of reports. Such reports may be generated from much larger collections of data stored in business data bases. A typical report accesses dozens to thousands of records (or more) and requires a few seconds to many hours to generate. Typically, the records appearing in a report are organized by one or more level breaks after which totals or subtotals of numerical data are provided. In addition, most reports are highly formatted to provide relevant background information and facilitate understanding. A single report may be related to other reports, and a whole group of reports may be used by many people associated with a enterprise all of whom need to see the same consistent set of information. Examples of such reports include reports containing records of open orders, sales forecasts, customer statements, and balance sheets.

Traditionally, powerful data base tools have focused on either transaction or Decision Support System (DSS) components. Transaction components are used primarily to put information into a data base. They are designed to support people in focused work groups such as order entry, customer support, or accounting. A typical interaction with a transaction system involves a few data base records and operates with sub-second response time. DSS components, on the other hand, are used to carve up data base information for analysis and strategic decision making. These components involve answering very unique questions. One answer often leads to another questions, creating a pattern of uses referred to as "diving" or "mining."

Users of reports far out number users of the transaction and DSS components of data base applications. Unfortunately, relatively few report writing systems are available for business applications. Those that are available suffer from various difficulties. For example, most report writers deliver only static, electronic versions of printed reports. These reports typically contain no more information than is required to display them on a computer screen or printed page. They fail to provide any advanced functionality that allows users to interact with, search, and annotate.

For example, one product, CRYSTAL REPORTS, from Crystal Computer Services, Inc. generates reports for viewing, but thereafter stores only the data base records used in the generating the reports. All formatting and data arrangement information used in the report is lost, and must be regenerated each time the report is to be viewed. Further, in reports requiring more than a single flat set of data base rows (a fairly common occurrence for sophisticated report writers), the data base must be queried each time that a new report copy is to be displayed. Obviously, this defeats the advantage of persistently storing data base records used in generating reports.

Thus, there exists a need for an improved method that can generate and store reports in a manner that facilitates their repeated display, printing, and searching.

SUMMARY OF THE INVENTION

The present invention fills this need by providing a method for persistently storing, in an object-oriented format, various pieces of information required to display and search a report. The information is stored in a logical hierarchy including multiple sections. Commonly, though not necessarily, these sections are separated by "level breaks" which represent divisions between report entities of a given type. As an example, the customers presented in a sales report might correspond to the first level entities which are separated from one another by level breaks. Further, individual orders placed by a given customer might correspond to second level entities (which are separated in the report by level breaks at the second level), and individual items included in a given order might correspond to third level entities. Each level break (or more generally each section break) is stored as an object which may include information about an entity such as the entity's name and location, and/or report totals associated with that entity.

In the level break hierarchy, each level break object at the first level may reference one or more level break objects at the second level, and, in addition, may reference objects representing the visual regions (or "frames") in which report information pertaining to the first level entity is displayed. For example, one frame might display a customer's address. The frame objects may, in turn, each contain various "control objects" which describe the formatting, size, and other associated information pertaining to the display of frames. Each level break object at the second level may further contain one or more individual items of information within frames and/or level break objects at the third level (if such level break objects exist).

The described arrangement of report data and formatting in a report object has certain inherent advantages over the prior art. By providing the information of a report as persistently stored objects, having inheritance and other features of an object-based representation, the information can be quickly and easily reconstituted, displayed, and/or searched. Further, the meaning associated with the various report entities is preserved. Such "meaning" might include, for example, the fact that a total in a level break object represents the sum of various entries in a section associated with the level break. This meaning preservation is particularly advantageous in on-line systems where particular users can obtain the particular information that they require by conducting a high-level search of the report object. This is impossible in prior systems which store reports in ASCII text or some other format such as Postscipt™.

In preferred embodiments, the level break hierarchy exists in parallel with a page-based hierarchy. This allows for page-by-page printing of reports in a format corresponding to the "internal" layout of the report. In the page-based hierarchy, the highest level object is a page object, followed by a flow object, and then a frame object as described above. Each printable/displayable page is provided as a separate object which specifies margins, headers, etc. Within each page, one or more flows generally define where the report information will be displayed. Finally, the frames, described above, define visual regions within the flows where specific information is displayed. Collectively, the level break and page hierarchies provide the arrangement of all objects in a base object referred to herein as a "report object."

An important aspect of the invention relates to a method of compressing and persistently storing a report object in long term memory. This method can be characterized as including the following steps: (a) identifying a persistent instance to be stored to long term memory; (b) identifying a report object class corresponding to the persistent object; (c) providing a template specifying a property value for each of one or more instance properties associated with instances of the report object class; (d) providing a description of the persistent instance, which description has a description field for each of the one or more instance properties; (e) for each property value of the template, determining whether a corresponding instance property of the persistent instance matches the property value specified in the template; (f) providing the description field corresponding to a given instance property with a first identifier chosen to indicate that the template property value matches the persistent instance when, in fact, the template property value does match the instance property; and (g) storing the description of the persistent instance in long term memory.

When a property value of the template does not match the corresponding property of the persistent instance, then a second identifier is provided to the appropriate description field. In preferred embodiments, the first and second identifiers are represented as a single bit which has one value for the first identifier and a second value for the second identifier. Because report objects generally contain many objects in which properties are, in large part, consistent from instance to instance, properly chosen property values in the template can lead to a great reduction in the amount of storage space required to represent the persistent instances. This is because instance properties can be represented by a single bit (the first identifier) when those properties match the property specified in the template. For example, a property might be the font employed in an object. If the font used in most instances is identical, then the stored descriptions of the instances need only represent the font as a single bit.

A computer system for implementing the above-described compression and storage routine preferably includes the following features: (a) a central processing unit in communication with a volatile memory; (b) a class library at least partially stored on long term memory or the volatile memory; and (c) a persistent object storage manager for compressing and persistently storing persistent instances of the report object classes. The class library includes a collection of report object classes for defining visual and logical features of a report. And the persistent object storage manager includes the following features: (1) computer code for comparing a first persistent instance of a first report object class with a template (described above) for that first report object class, (2) computer code for generating a description of the first persistent instance based upon a comparison of the template with the first persistent instance, and (3) computer code for storing the description of the first persistent instance to long term memory in a persistent report object file. As with the method described above, the description of the first persistent instance is provided with (i) a first identifier for those instance properties in which the template property matches the instance property, and (ii) a second identifier for those instance properties in which the template property does not match the instance property of the persistent instance.

In a preferred embodiment, the persistent instances are generated by a combination of entities including (i) an object generating program for encoding an object-oriented description of the report, and (ii) an interpreter for interpreting the object-oriented description to generate the persistent instances of report object classes. The object generating program takes as input the class library and a "report design" specified by a user. Preferably, the report design is generated with the aid of graphical user interface having user interface tools which allow users to visually generate the layout of a report.

These and other features of the present invention will be presented in more detail in the following detailed description of the invention and the associated figures.

BRIEF DESCRIPTION OF THE DRAWINGS

FIGS. 2A and 2B are illustrations of two displayed pages of a sample report which illustrate some features of reports in general.

DESCRIPTION OF THE PREFERRED EMBODIMENTS

1. DEFINITIONS

Figure 1:
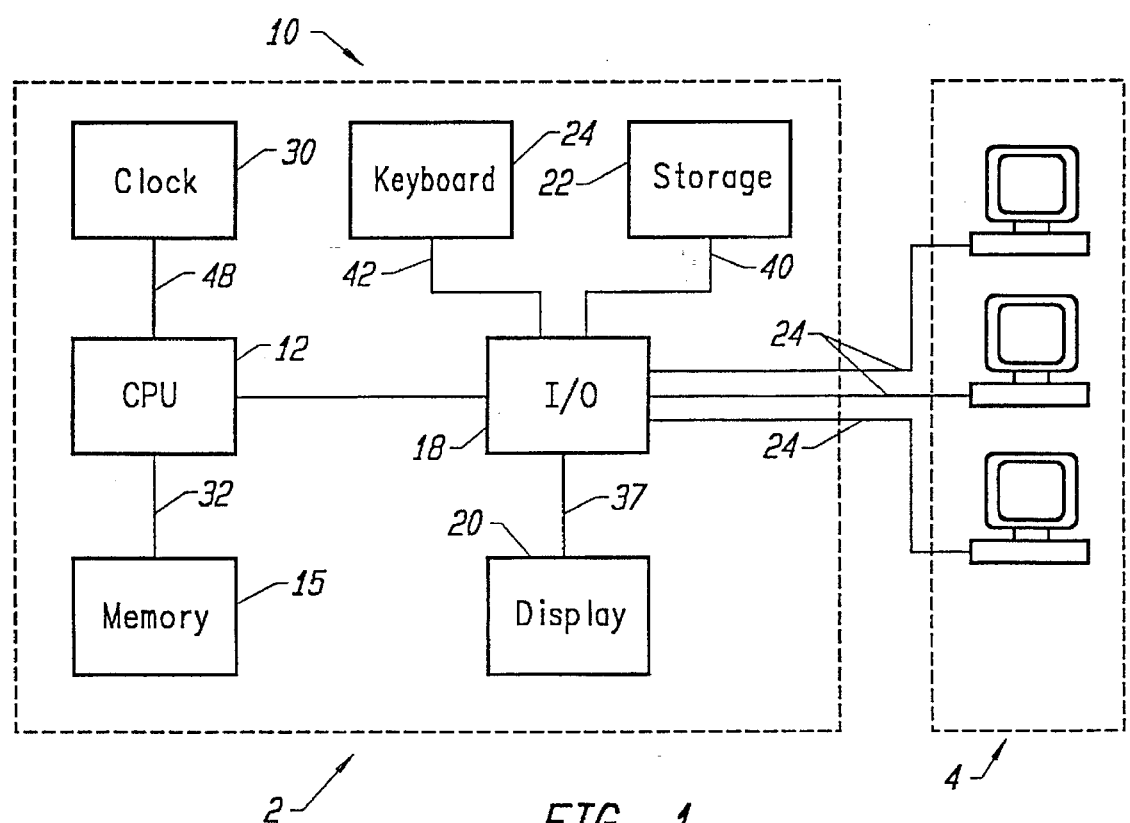
FIG. 1 is a schematic illustration of a network-based computing system on which the present invention may be implemented.

The following terms are used in the instant specification. Their definitions are provided to assist in understanding the preferred embodiments described herein.

An "object" is a discrete, distinguishable data entity having a unique identity. Examples of objects might include lines of data in a report, a window or frame in report, a title heading in a report, etc. Each two objects are distinct even if their properties (such as name and size) are identical. Because no two objects are identical, each has a unique ID which can be referenced by other objects.

Objects with the same data structure (properties) and behavior (methods or operations) may be grouped into a "class". Frames, graphs, and pages are examples of classes used in a report object. Simply stated, a class is an abstraction that describes properties important to an application. Each class describes a potentially infinite number of individual objects. Each object is said to be a "instance" of its class. Each instance of the class has its own value for each property but shares the property names and operations with other instances of the class.

An object may inherent properties and operations based on a hierarchical relationship. Typically, a higher level class is defined broadly and then refined into to successively finer "subclasses." Each such subclass incorporates, or "inherits," all of the properties of its "superclass" and adds its own unique properties. The properties of the superclass need not be repeated in each subclass. In a report object, for example, dates, currency, and numerals are all subclasses of the superclass "controls." All three subclasses inherent the properties of "graph," such as a defined visible region on the screen.

Objects and object-oriented programming generally are described in many texts. One suitable introductory text is "Object-Oriented Modeling and Design" by Rumbaugh et al., Prentice-Hall, Inc., Englewood Cliffs, N.J., 1991 which is incorporated herein by reference for all purposes.

A "report" generally is a highly formatted list of data containing several, even thousands of records. Very often, reports are characterized by "level breaks" between members of a group of records provided in the report.

A "report object" is a persistently stored object containing many other objects and logical arrangements of those objects required to display a given report. Thus, a report object may contain objects defining pages, frames, level breaks between records, etc., all for a single report. The report object may be stored in a compressed form on non-volatile memory such as a magnetic hard disk, a floppy disk, a CD ROM, etc. When the report is to be displayed or otherwise accessed, at least part of the corresponding report object may be loaded into a volatile memory such as RAM for access by a computer CPU.

A "section" is a part of a report containing data having a common feature or purpose. Most reports contain sections separated by level breaks. However, other sections may also be used. These include, for example, sequential or parallel sections containing different types of data. For example, the data for a given customer in a report may be divided into an order section describing orders placed by the customer, a problem section noting any problems that the customer is having, and a potential order section describing potential orders to be placed by the customer.

"Level breaks" are provided at each division among members of a high level group appearing in a report. For example, consider a report shown in FIGS. 2A and 2B listing customers, orders placed by the customers, and items in each order. The report is structured such that it first displays (beginning at the top of the report) all orders of the first customer. Within the display of each such order, there is displayed the items of the order. Each item may be displayed with information such as a price and/or a part number or relevant information needed by the report user. After all of the first customer's orders (and all items in those orders) have been displayed sequentially, a second customer is identified with attendant orders and items also listed. The division between the first customer and the second customer in the report constitutes a "level break." Further, each division between the individual orders under a given customer constitutes a level break. In the example of FIGS. 2A and 2B, both customers and orders constitute "high level" groups because their members (individual customers and orders) each contain information about lower level components, such as the items in a order. Generally, only such "high level" groups have level breaks. The divisions between members of the lowest level groups such as items are not deemed to constitutes level breaks.

Level breaks are conveniently used in reports to present "totals" of the information pertaining to a particular high level entity. For example, first customer level break shown FIG. 2A provides a total dollar volume of orders placed by that customer. Further under each order of that customer, a separate total number of items and total dollar value is provided. It should be understood that in the context of this invention, level breaks are stored as instances of a level break object class. Each instance specifies the particular frame(s), section of the report, or report which uses each row of data associated with the report entity delineated by the level break.

"Frames" are rectangular regions of a report defining the locations of sets of data to be displayed in the report. Each frame is also an instance of an object class "frame" in the report objects of the present invention. Frame objects have such properties as background color, border style, margins, and page breaks, as well as the contents of the frame. The contents include the other frames and controls which appear inside the frame. In this invention, these other frames and controls are themselves objects.

A "flow" is a region of a report page where the records/data for the report are displayed or printed. Thus data is, in essence, "flowed" into the report in the flow regions defined within the page by flow objects. A flow may contain one or more frames. Multiple flows may be provided on a single page to allow, for example, information from two different reports to appear in parallel on a given page. A flow object defines the printable area of a page, and may specify other flow object properties such as the alignment of frames to the center (left or right) in the flow.

A "control" is a feature of a report's frame or page that presents information other than the tabular or sequential data that typically is presented for comparison in a report. Examples of controls that might be included on a page of a report include static text, text streams from a database, integers, bitmaps, graphics of various types, and multimedia output. Such controls can be used to display, for example, page numbers, titles, footnotes, and information about a specific entity described in the report.

2. PHYSICAL SYSTEM FOR IMPLEMENTING REPORT OBJECT GENERATION AND VIEWING

The invention employs various process steps involving data stored in computer systems. These steps are those requiring physical manipulation of physical quantities. Usually, though not necessarily, these quantities are electrical or magnetic signals capable of being stored, transferred, combined, compared, and otherwise manipulated.

Commonly, these signals are referred to as bits, values, elements, variables, characters, data structures, or the like. It should remembered, however, that all of these and similar terms are associated with the appropriate physical quantities and are merely convenient labels applied to these quantities.

Further, the manipulations performed are often referred to in terms, such as storing, providing, or generating. In any of the operations described herein that form part of the present invention, these operations are machine operations. Useful machines for performing the operations of the present invention include general purpose digital computers, networks of such computers, or other programmable systems. In all cases, there is a distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer or network of computers selectively activated or reconfigured by a computer program stored on a machine readable medium. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given below.

Still further, the present invention relates to machine readable media on which are stored program instructions for performing operations on a computer. Such media includes by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

Referring now to FIG. 1, a preferred computer system 10 of the present invention includes a server 2 and multiple clients 4. In preferred embodiments, report objects and report object generating software are providing on server 2 and can be accessed through the various clients 4. The server 2 in accordance with the present invention includes a central processing unit (CPU) 12, input/output (I/O) circuitry 18, and memory 15—which may be read only memory (ROM) and/or random access memory (RAM). The server 2 may also optionally include a display 20, a mass storage unit 22, a keyboard 24, and a clock 30.

In one embodiment, the CPU 12 is preferably one or more microprocessor chips selected from complex instruction set computer (CISC) microprocessors, reduced instruction set computer (RISC) microprocessors, or other available microprocessors. CPU 12 is coupled to memory 15 by a bi-directional data bus 32 but may also be coupled by a unidirectional data bus in the case of ROM. Memory 15 is also coupled to CPU 12 by appropriate control and address busses, as is well known to those skilled in the art.

CPU 12 is coupled to the I/O circuitry 18 by bi-directional data bus 36 to permit data transfers with peripheral devices. I/O circuitry 18 preferably includes a number of latches, registers and direct memory access (DMA) controllers. The purpose of I/O circuitry 18 is to provide an interface between CPU 12 and such peripheral devices as display assembly 20, mass storage 22 (e.g., disks), keyboard 24, and clients 4. Display assembly 20 of server 22 receives data from I/O circuitry 18 via bus 37 and displays that data on a suitable screen. Mass storage 22 can be coupled to I/O circuitry 18 by a bi-directional data bus 40. Generally, mass storage 22 will be a hard disk drive, a tape drive, or some other long-term storage device. It may be used to store report objects of this invention, programs for generating such report objects, and programs for viewing such report objects.

The keyboard 24 communicates with the CPU 12 via data bus 42 and I/O circuitry 18. In addition to keyboard 24, other types of input device can a/so be used in conjunction with the present invention. For example, a computer mouse, a track ball, a track pad, or a pen-based tablet can be used to manipulate a pointer on display screen 20. Clock 30 preferably comprises a real-time clock to provide real-time information to the system 10. Alternatively, clock 30 can simply provide regular pulses to, for example, an interrupt port of the CPU 12 which can count the pulses to provide the time function. Clock 30 is coupled to CPU 12 by a data bus 48.

The clients 4 may include terminals, personal computers, workstations, minicomputers, and mainframes. For purposes of this invention, any data processing devices which can access the report objects or report object generating software on server 2 are clients. It should be understood that the clients may be manufactured by different vendors and may also run different operating systems such as MS-DOS, Microsoft Windows, Microsoft NT, various forms of UNIX, OS/2, MAC OS and others. Clients 4 are connected to I/O circuitry 18 via bi-directional lines 24. Bidirectional lines 24 may be any suitable media such as coaxial cable, twisted pair wiring, fiber optic line, radio channels, and the like. Further, the network resulting from the interconnection of the lines 24 may assume a variety of topologies, including ring, bus, star, and may include a collection of smaller networks linked by gateways and bridges. As with the clients 4, it should be understood that the server 2 may run different operating systems such as MS-DOS, Microsoft Windows, Microsoft NT, UNIX, VMS, OS/2, MAC OS and others. The clients need not use the same operating system as the server.

It is also within the scope of this invention to implement the apparatus and methods for generating, storing, and viewing report objects on a "stand-alone" computer which does not form part of a network.

3. EXAMPLE

FIGS. 2A and 2B present a sample report of the type that might be generated in accordance with the present invention. FIGS. 2A and 2B represent pages 1 and 2, respectively, of a two page sales report showing the orders place by three customers of a semiconductor chip distributor. The distributor provides items including various DRAMs and SRAMs, as well as processor and graphics chips. Page 1 shows the details of three orders placed by "Customer A" of the chip distributor. In addition, page 1 shows one order placed by a "Customer B." Page 2 shows two more orders of Customer B, as well as two orders placed by a "Customer C."

Consistent with the level break hierarchy described above, the report lists each customer's orders sequentially. That is, all the orders of a given customer are listed before those orders of the next successive customer. In addition, each time the order information for a new customer is displayed, a header is provided identifying the name and address of that customer. Level breaks exists between each two sections of customer information. As shown, one level break 60a exists between the orders for Customers A and B, and another level break 60b exists between the orders shown for Customers B and C. Conveniently, though not necessarily, level breaks provide an opportunity to display totals associated with the report of a high level entity. In the example shown in FIGS. 2A and 2B, the customer level breaks are used to display the total dollar volume of the orders associated with each customer.

The orders placed by each customer are separately displayed within the sections of the report associated with each customer. Thus, for example, Customer A has three associated orders in its section of the report, each of which constitutes a "second level" entity within the report. It should also be noted that the divisions between each sequential order of a given customer also represent level breaks. As shown in FIGS. 2A and 2B, these level breaks are used to display the total quantity of items ordered and the total dollar value of the order.

Within each order, the various types of chips sold are sequentially displayed under the headings "category," "code," "description," "quantity," "price," and "extension." Each such item represents a lowest level data object in the report. As such, no level breaks are provided between the individual items placed in each order.

It should be understood that the report depicted in FIGS. 2A and 2B is a very simple example with very little formatting and no graphics. The powerful object oriented design of the invention allows for easy integration of graphics and highly formatted reports.

4. LAYOUT OF A REPORT OBJECT

Figure 3:
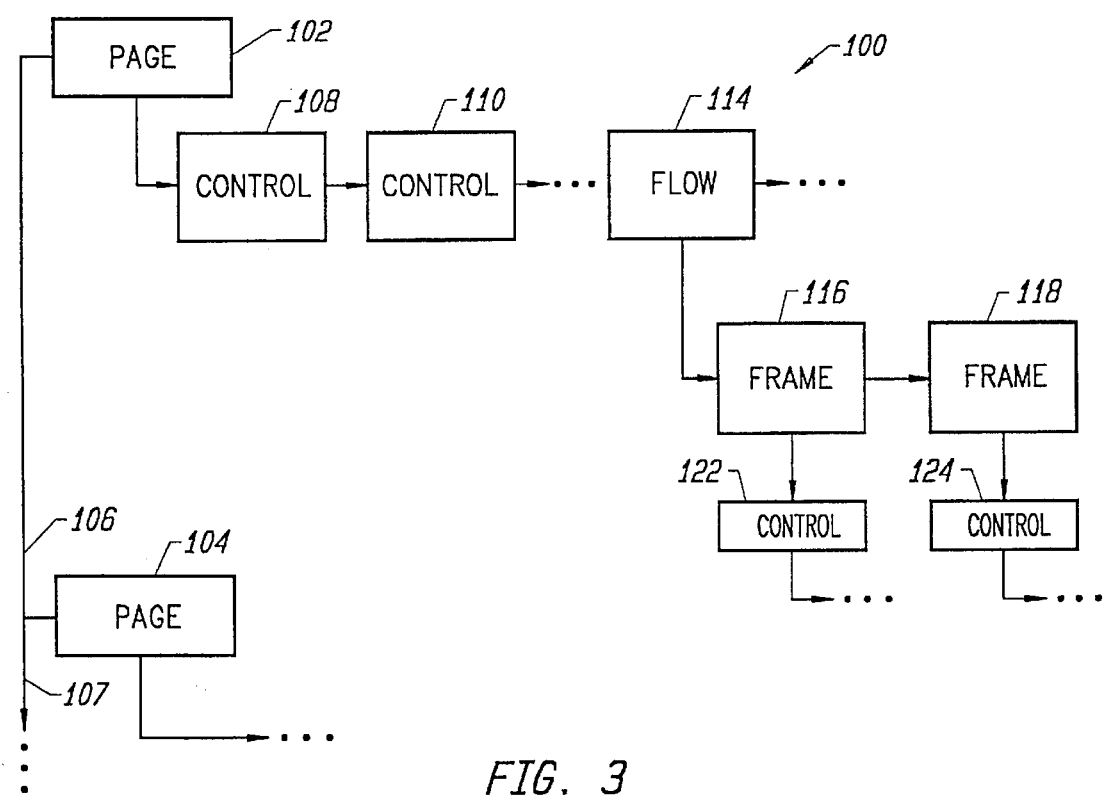
FIG. 3 is schematic representation of a report object of this invention organized according to a page-based hierarchy.
Figure 4:
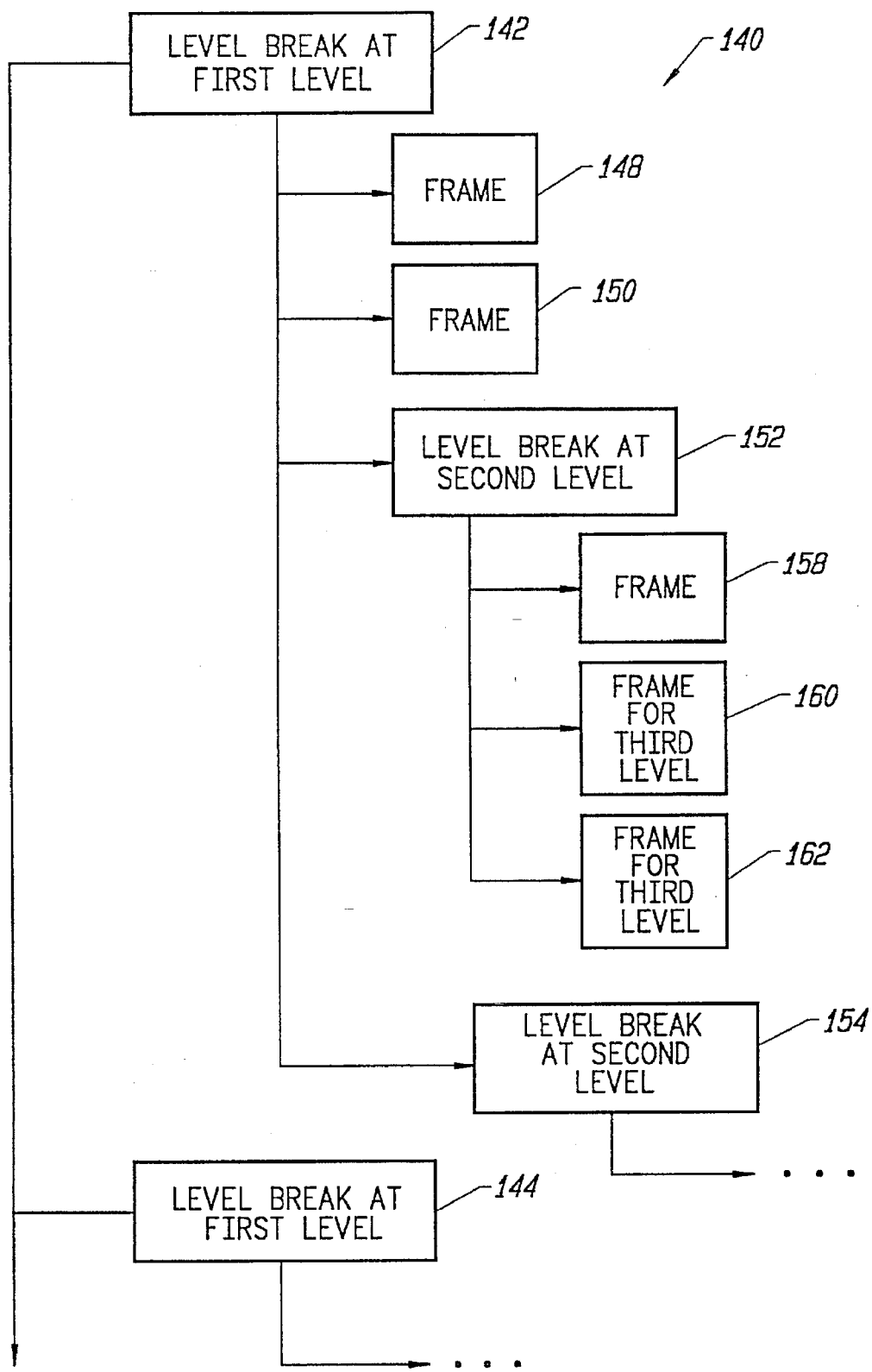
FIG. 4 is a schematic illustration representing a report object of this invention organized according to a level break hierarchy.

FIGS. 3 and 4 show two logical hierarchies of a persistently stored report object according to a preferred embodiment of the present invention. As indicated, the report object has both a page logical hierarchy (FIG. 3) and a level break logical hierarchy (FIG. 4). Referring first to FIG. 3, the page hierarchy 100 includes at the highest level, a series of page objects or instances 102, 104, . . . , each representing a separate page of the final report. Each such page object provides the backdrop for laying out flows of information that will appear on a given page of the report (e.g., on an 8½×11 inch sheet). As shown, page objects 102, 104, . . . sequentially reference one another as indicated by lines 106 and 107. In a preferred embodiment, the contents of the page hierarchy are connected to one another in a linked list. In especially preferred embodiments, each individual page object references a header for the next sequential page. The header, in turn, contains a pointer to the current memory storage location for its associated page object.

Each page object also references objects for all the information contained in that page (both displayed information and other logical undisplayed information). In the hierarchy displayed in FIG. 3, the next lower level below the page objects references a series of controls 108, 110 . . . and flows 114 . . . . As indicated above, each control is an object which contains the information for some feature displayed on the page. Examples of page controls include headers such as rifles, footers, page numbers, footnotes, etc. Also as noted above, each flow such as flow 114, defines the part of a page where the data for the report (e.g., data from a database) is presented. Thus, data is, in essence, "flowed" into the report in the flow regions defined within the page by flow objects.

Each flow, in turn, may reference multiple frames. In FIG. 3, flow object 114 is shown referencing frame objects 116 and 118. As noted, such frames represent rectangular regions for displaying report data on a page, and within a given flow. Like the pages themselves, the frames may reference one or more controls. Examples of controls on frames include headings, blank space, and totals at the end of a level break. As illustrated in FIG. 3, frame object 116 includes control objects 122, . . . , and frame object 118 includes control objects 124 . . . .

Various other objects in addition to those depicted to the hierarchy of FIG. 3 may be presented with a page object. Such objects include, for example, graph objects which display graphs in various formats, objects which contain methods for displaying pop up menus in response to certain events, objects for displaying dialogs or control panels in response to mouse clicks, etc.

The arrangement presented in FIG. 3 provides a visual relationship that facilitates the display of report objects in a classical object oriented sense. Thus during display of a report object, a page object first displays itself according to its properties such as its size and background. Thereafter, the page object directs the lower level objects that it references to display themselves one at a time over top of the page. Thus, the complete information in the visual page is built up from the objects that make up that page by following the hierarchy of FIG. 3.

Each flow and frame object persistently stored according the hierarchy shown in FIG. 3 references its own base page. For example, frame object 118 contains as a property, a reference to page object 102. Thus, any searching protocol that locates data in a given frame object also locates that frame's page object, so that the page containing the frame of interest can be displayed, in page format, upon completion of the search.

Referring now to FIG. 4, a level break logical arrangement 140 of the persistently stored report objects of this invention is shown. As displayed, level break objects 142 and 144 at a first level are presented at the top of the hierarchy, and are sequentially linked to one another. In the sales report example of FIGS. 2A and 2B, objects 142 and 144 could represent, for example, level breaks between Customers A and B and between Customers B and C. Moving down the hierarchy, one or more frames such as frames 148 and 150 logically reference level break object 142. In addition, one or more level break objects at a second level such as objects 152 and 154 reference level break object 142. Similar branching would be provided for level break object 144 and others at the first level.

The level break objects such as objects 142 and 144 include such information as details about the entity above the level break and summaries of the report information presented for that entity. In the sales report example of FIGS. 2A and 2B, level break object 142 might contain Customer A's name and address, Customer A's total purchases in dollars, and Customer A's total purchases in number of items. Similar information for Customer B would be provided in object 144. The totals data would be displayed in a frame devoted to the particular customer. The frames provided at the second level specify the visual location of information pertaining to the first level entity. For example, frame 148 might specify the location of Customer A's address, and frame 150 might specify the location of Customer A's total sales. Following this example, level break objects 152 and 154 might represent breaks between orders 1 and 2 and between orders 2 and 3 for Customer A. Information contained in objects 152 and 154 might include the order number and the totals of the order.

Moving further down the hierarchy, each level break object at the second level (objects 152, 154, . . . ) may reference one or more frames 158, 160, and 162, some of which contain information at the third level (frames 160 and 162). Thus, for example, level break object 152 includes frame objects 158, 160, and 162, of which third level data is provided with frames 160 and 162. These third level frame objects contain the individual pieces of report information provided at the third level (e.g. items of an order). It should be understood that level breaks are defined between only those entities which are not at the lowest level of the hierarchy. Thus, no level breaks are defined between instances of the third level objects.

It should be recognized that other forms of section breaks, besides level breaks, may be employed in the report objects of this invention. For example, the report may be broken into sections that contain different types of information separated by breaks. As an example, the breaks may divide data pertaining to a particular customer into actual orders placed, potential orders to be placed, and problems that the customer has observed. The breaks between these three types of data do not qualify as level breaks as defined above. Nevertheless, the present invention pertains to reports having such section breaks whether used alone or in combination with level breaks.

It should be understood that a persistently stored report object of this invention contains both a page-based logical structure as in FIG. 3 and level break-based logical structure as shown in FIG. 4. The frames in hierarchy 140 or FIG. 4 are identical to those in hierarchy 100 of FIG. 3, and may each include one or more controls (not shown) or other relevant objects as discussed in connection with FIG. 3. Suitable object classes for each of the hierarchies are shown in the attached source code appendix.

In preferred embodiments of the invention, the level break logical structure also provides the ability generate tables of contents which include a page listing for each level break in the hierarchy. This table of contents may be generated as a separate object and stored persistently with the rest of the report object.

Figure 5:
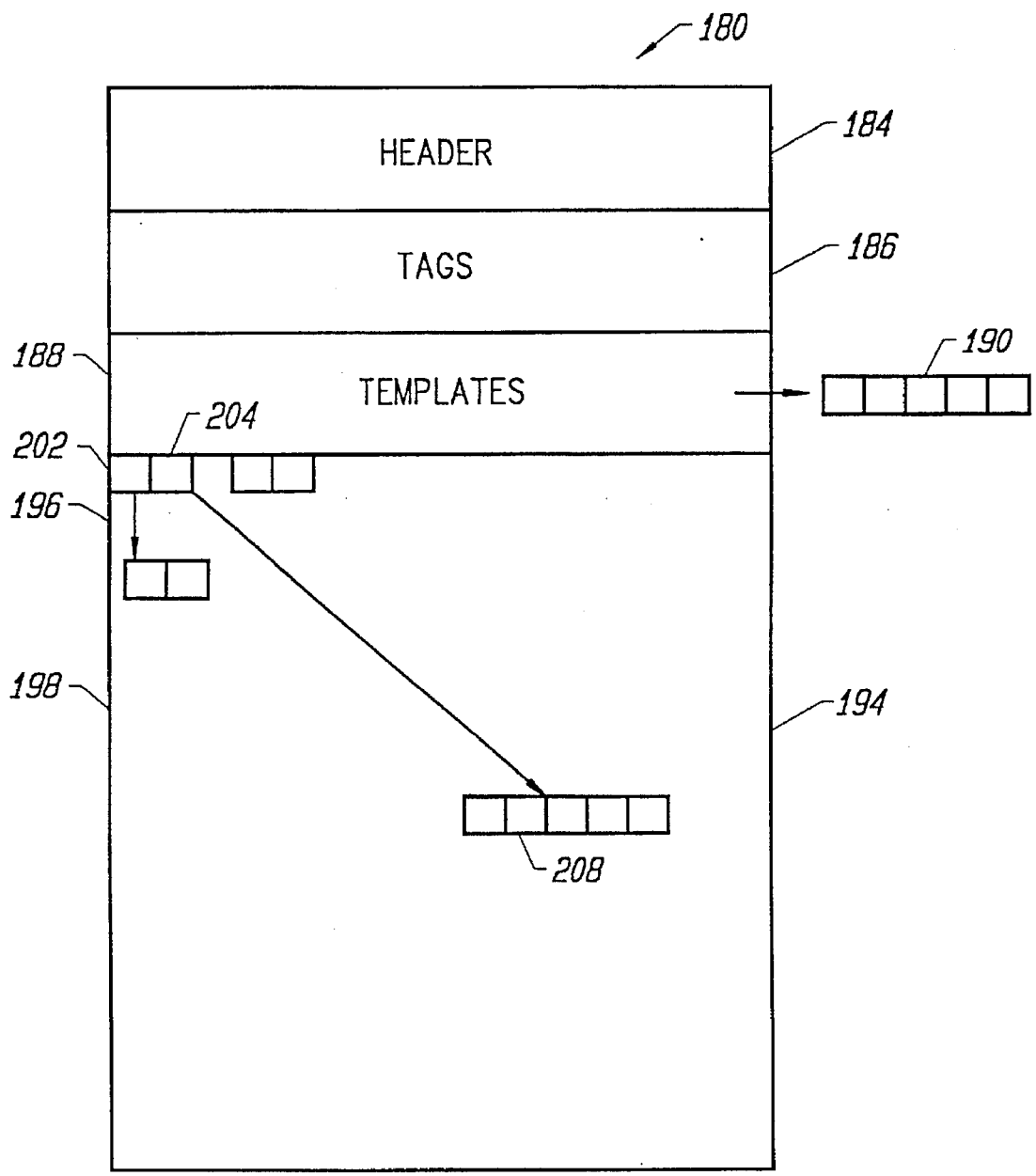
FIG. 5 is a schematic illustration of the physical file format employed to persistently store a report object of this invention.

In addition to the logical hierarchies of persistent report objects illustrated in FIGS. 3 and 4, there are, of course, corresponding physical file formats. A preferred file format of this invention is illustrated in FIG. 5. As shown there, file 180 includes a header section 184, a tags section 186, a templates section 188, and a body section 194. The header 184 includes such information as a pointer to the next free storage space to which instances can be written and a pointer to the "head" or first instance of each class in the report object. The tags in section 186 point to file locations of one or more instances in the file. These locations are used as starting points when the report object is to be accessed for viewing, printing, etc. Next, the section 188 includes multiple templates, each of which specifies a group of standard properties of an object class used in the report. For example, one template might specify the properties of the frames to be displayed in a report, and these properties might include, for example, background color, border style, margins, and shadowing. A specific template 190 is shown with multiple fields, one for each property necessary to define an instance of the class it represents. As explained below, templates allow compression of objects stored in connection with memory management protocols of this invention.

The body section 194 of the report object file includes a headers portion 196 and instance description section 198. Each persistent object of the report object includes a header in portion 196 and a description in section 198. Each header contains two pointers. A first pointer 202 points to the header for the next instance of the class to which its object belongs. A second pointer 204 points to the location in the body portion of the file which contains the description of the current instance. As shown, an instance description 208 is associated with the header under consideration. Each such instance description is a bit map which contains one field for each property of the relevant object class. A bit in each field is switched on or off depending on whether the value of the associated property is the same as or different from the corresponding value in the class template (e.g., template 190). If the values are the same, no further information is stored. However, if the values are different, information describing the specific property is included in the instance description 208. Thus, the only information stored for each unique object is that information which deviates from that of its template.

5. GENERATION AND STORAGE OF PERSISTENT REPORT OBJECTS

Figure 6:
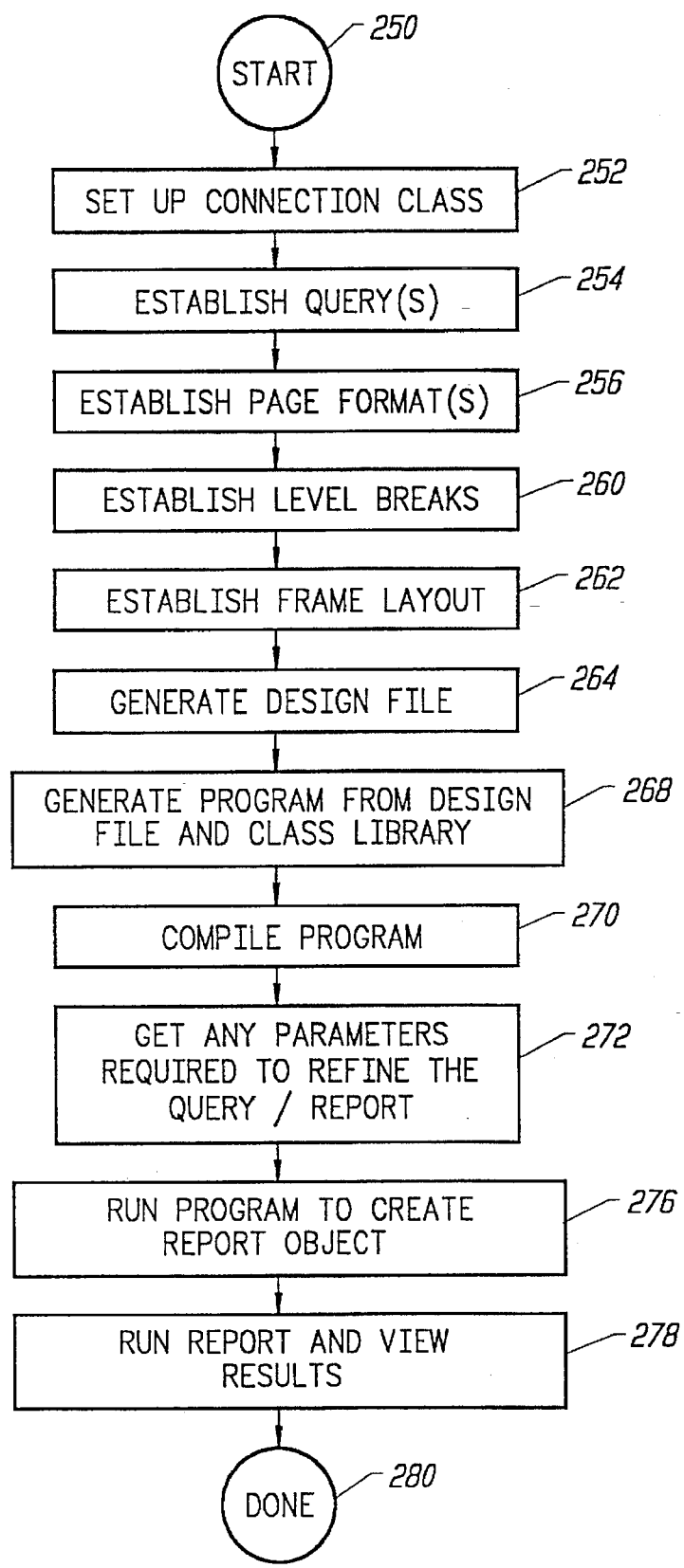
FIG. 6 is a process flow diagram illustrating the primary steps required to generate a report object in accordance with this invention.

The invention will now be described in terms of a general methodology for producing and/or displaying a report object with reference to FIG. 6. The method begins at 250 and then a connection class is set up at a step 252. That is, an object class is created, which class references the necessary information to connect to a source of data such as a database. After the connection class has been established, the system establishes a query data source at a step 254.

Thereafter, the system establishes a page format for the report at a process step 256. Next, in process step 260 and 262, the system establishes level breaks between appropriate categories of information to presented in the report and also establishes a frame layout within each level break. It should be understood that each of steps 252, 254, 256, 260, and 262 are preferably initiated by a user interacting with a graphical user interface on a computer screen. Specifically, the user specifies a connection class, a query, a page format, level breaks, etc. by conventional graphical techniques such as selecting objects from a palette, defining rectangular display regions on a page with the aid of a pointing device, and "dragging and dropping" information into specific parts of the report. The exact nature of the graphical user interface is not critical to this invention, and those of skill in the art will understand that many variations on this theme are possible. As the user is performing these steps, the computer system is beginning to establish an internal representation describing the report design as specified by the user at steps 252, 254, 256, 260, and 262. It should also be understood that the sequence of these steps may be altered, and ultimately depends upon how the user goes about setting up the report design. When the user has completed the design, the system has completed generation of a design file as indicated by a step 264 in FIG. 6.

After generation of the design file has been completed, the computer system generates a program from the internal representation in that design file and an object class library provided in the software. In preferred embodiments, the generated program is written in some form of object-oriented language such as C++. Whatever, language is chosen, the program's purpose is to generate the report object.

After the program has been generated, it is compiled at a step 270 and any other parameters required to refine the report are obtained at a step 272. Next, at a step 276, the finalized program is run to create the desired report object. This object may then be executed at a step 278 to view the results of the report. That is, step 278 develops a visual representation of the report with all information displayed on pages in the logical arrangement specified by the user/ designer at steps 252, 254, 256, 260, and 262.

Figure 7:
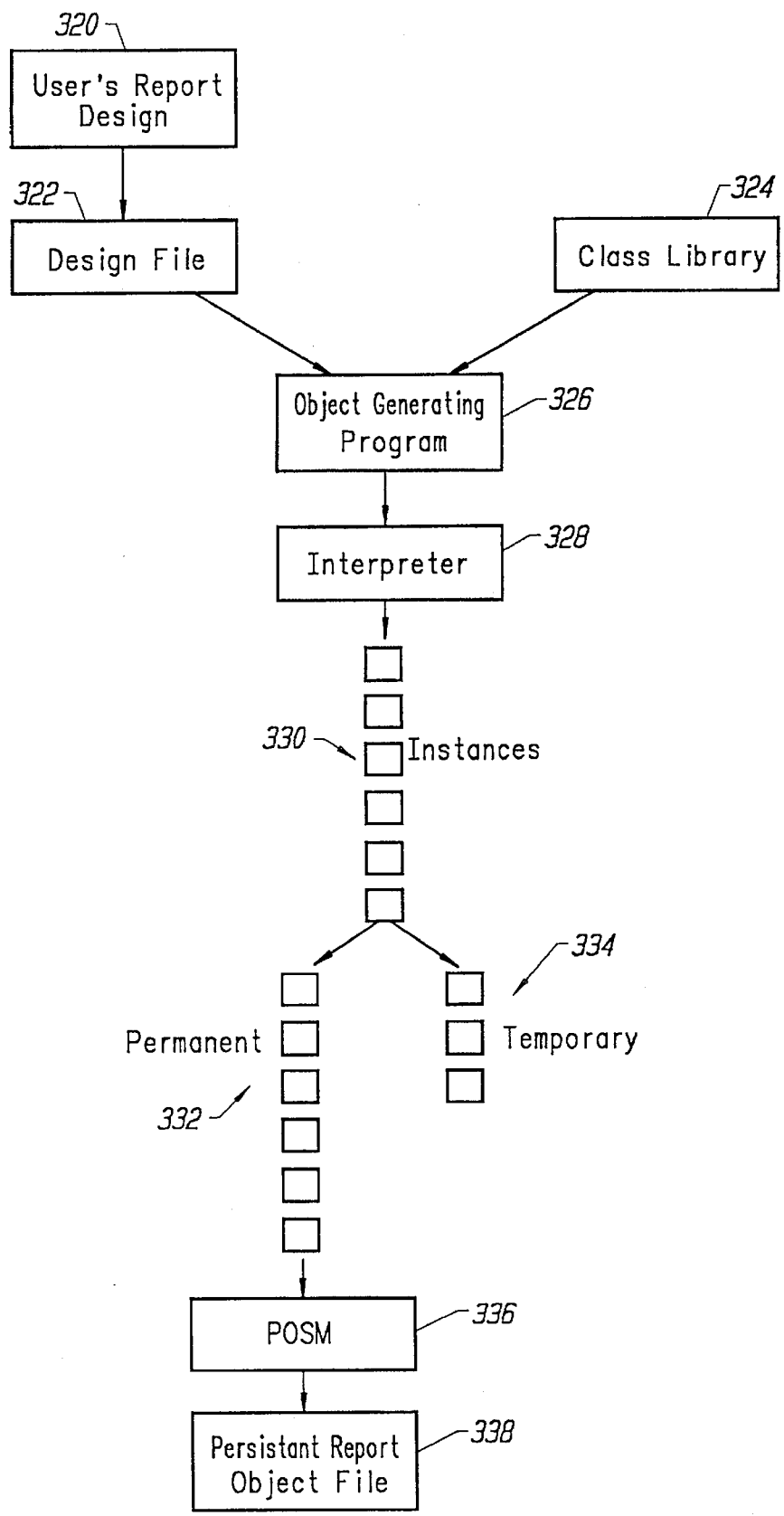
FIG. 7 is a schematic illustration depicting the interrelation of the various entities employed to generate and persistently store a report object in accordance with this invention.

FIG. 7 schematically depicts those entities which are important in generating a persistent report object file 338. As noted, the user provides a report design 320 via a graphical user interface, and the system converts the user's graphical inputs into a design file 332. It should be further noted that in addition to high level input parameters associated with a graphical user interface, sophisticated users may also provide lower level programming inputs. Regardless of what form the user's inputs take, they all find their way into the design file 322.

That file in conjunction with a class library 324 is used to produce an object generating program 326—preferably in some form of object oriented language. The class library 324 will be exemplified in more detail below. When program 326 runs on an interpreter 328, it generates subclasses of class 324 as appropriate for the information contained in the design file. From these subclasses, a series of instances 330 of object classes/subclasses from class library 324 are generated. Those instances may be either temporary instances 334 (used to construct the report object) or permanent instances 332. The permanent instances 332 are routed to a persistent object storage manager ("POSM") 336 which generates a persistent report object file 338 stored in long term memory. As noted, the persistent report object file 338 contains all of the object instances needed to search and/or visualize a report in accordance with the user's design.

Figure 8:
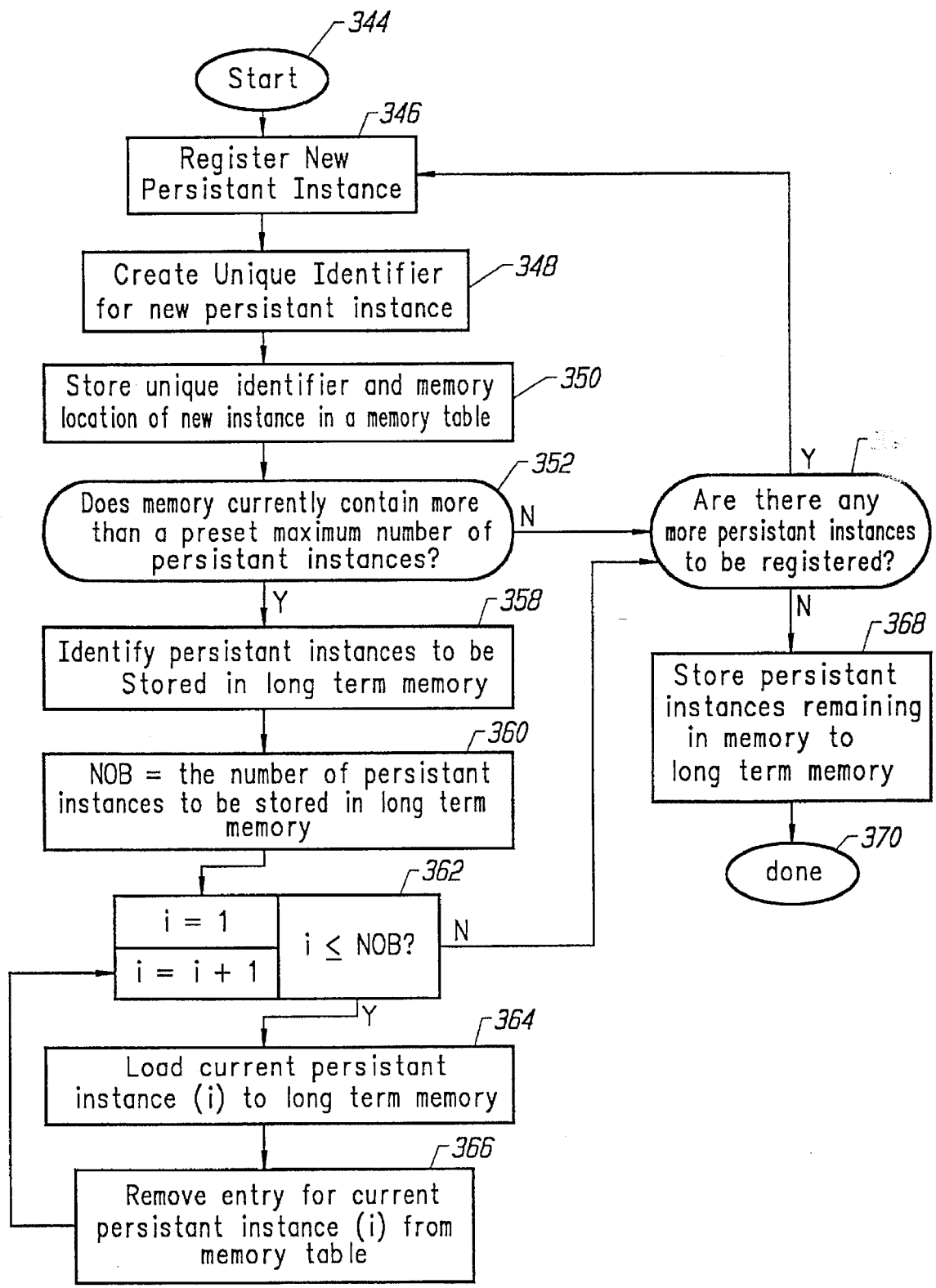
FIG. 8 is a process flow diagram illustrating the principle steps employed to persistently store instances produced as a report object is being generated.
Figure 9:
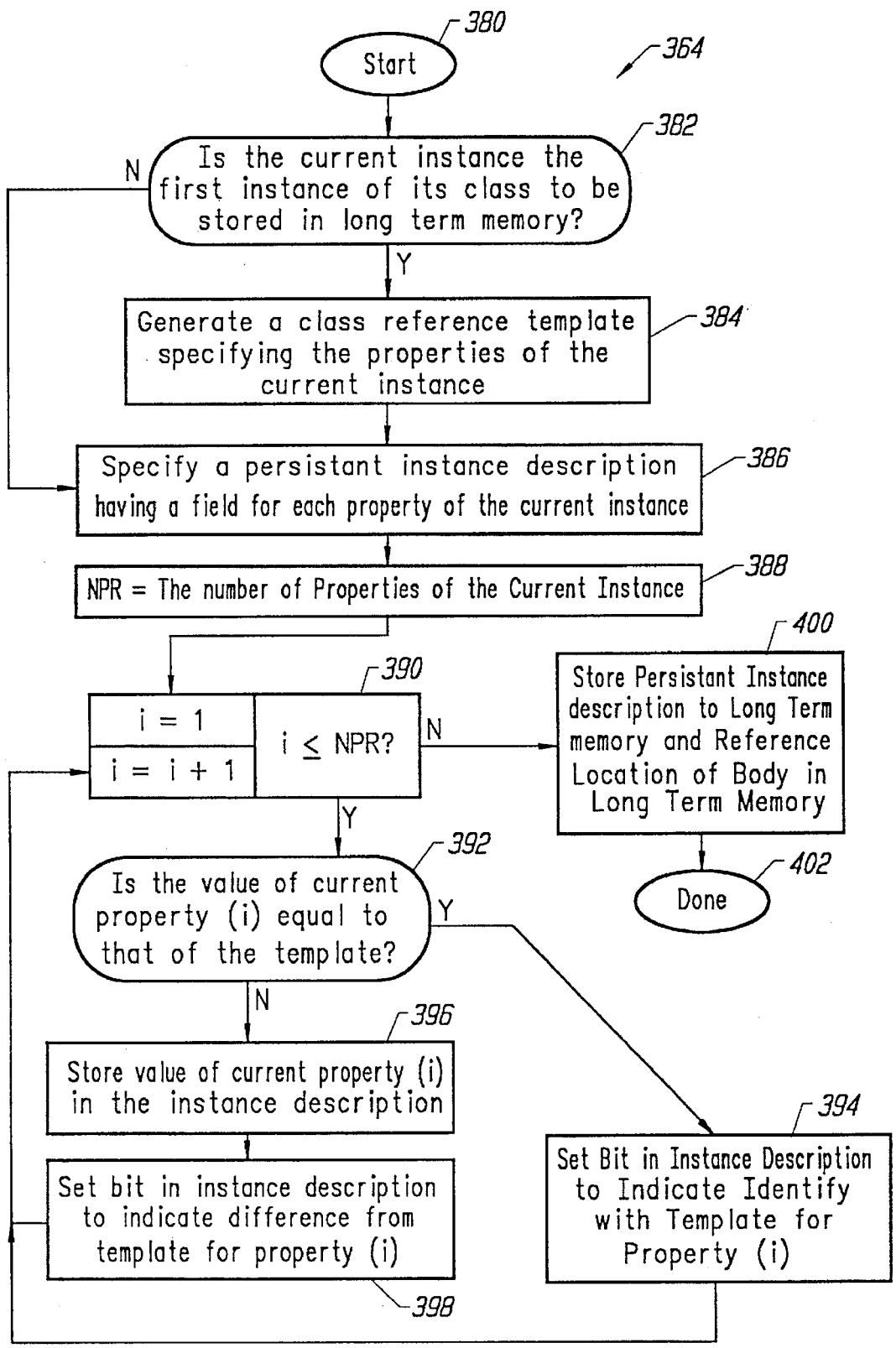
FIG. 9 is a process flow diagram detailing the steps by which a persistent instance is loaded to long term memory.
Figure 10:
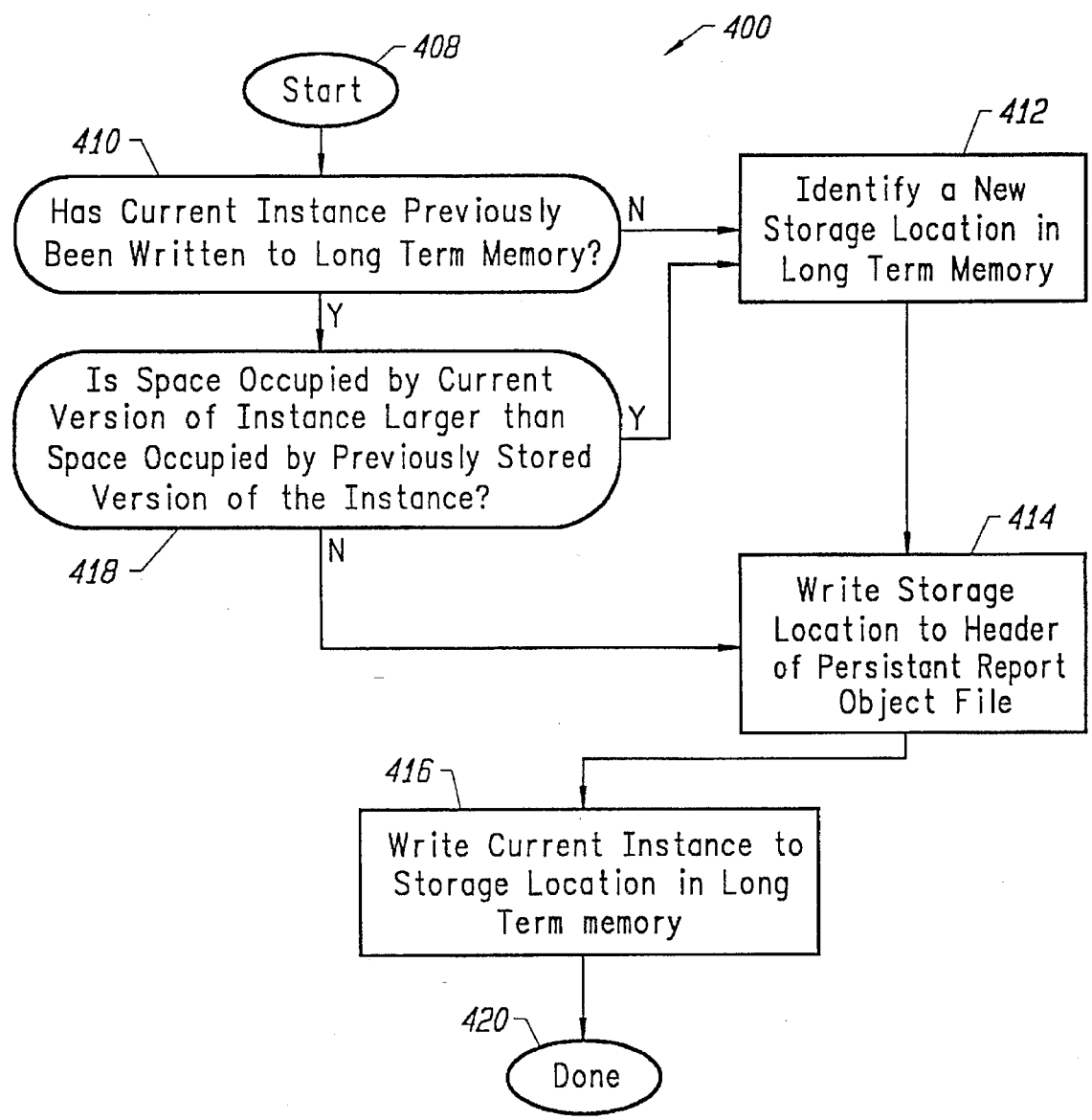
FIG. 10 is a process flow diagram detailing the steps by which a persistent instance is stored in physical data file.
Figure 11:
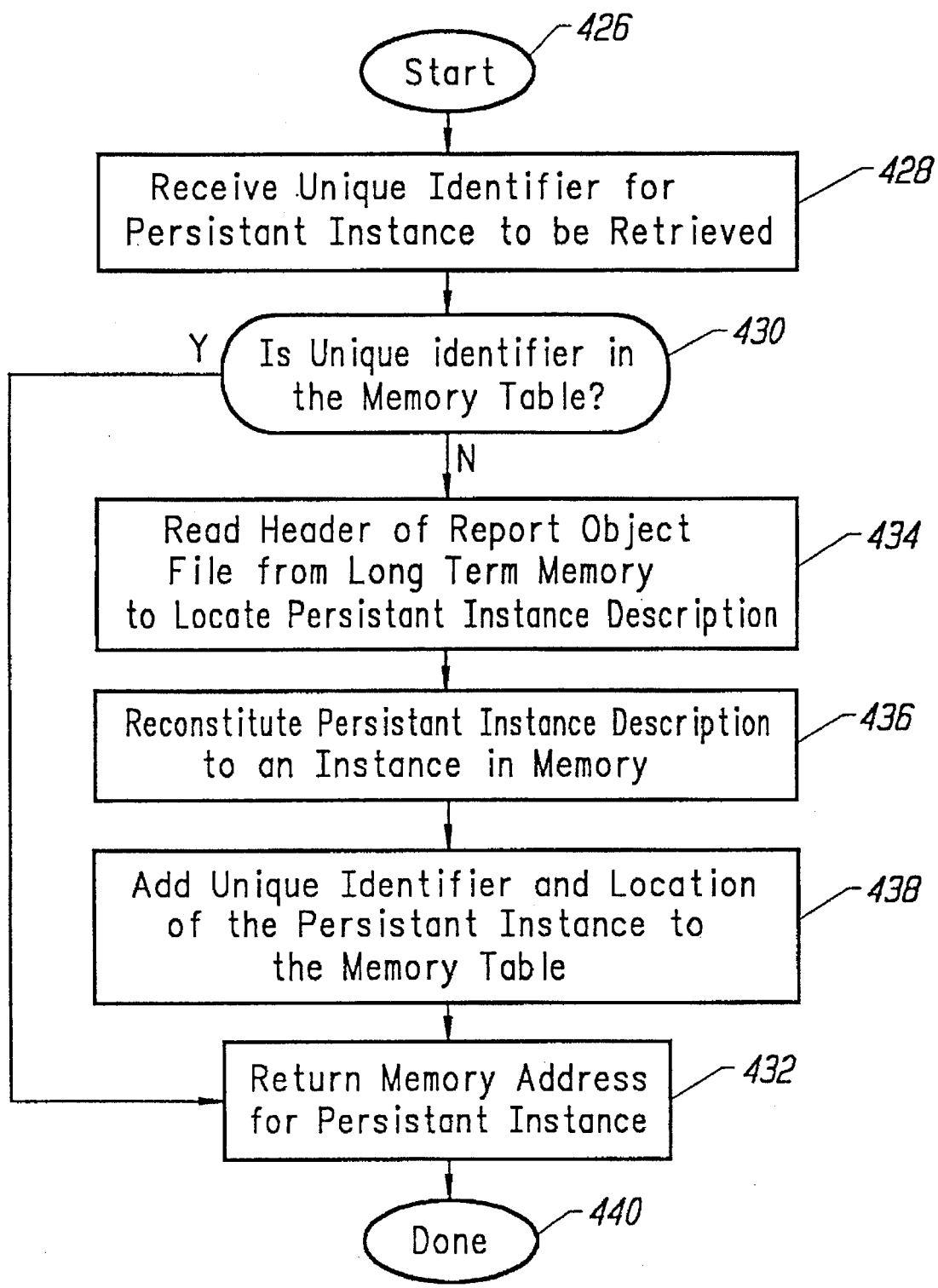
FIG. 11 is a process flow diagram illustrating the primary steps employed to read a persistent instance stored in a report object file.
Figure 12:
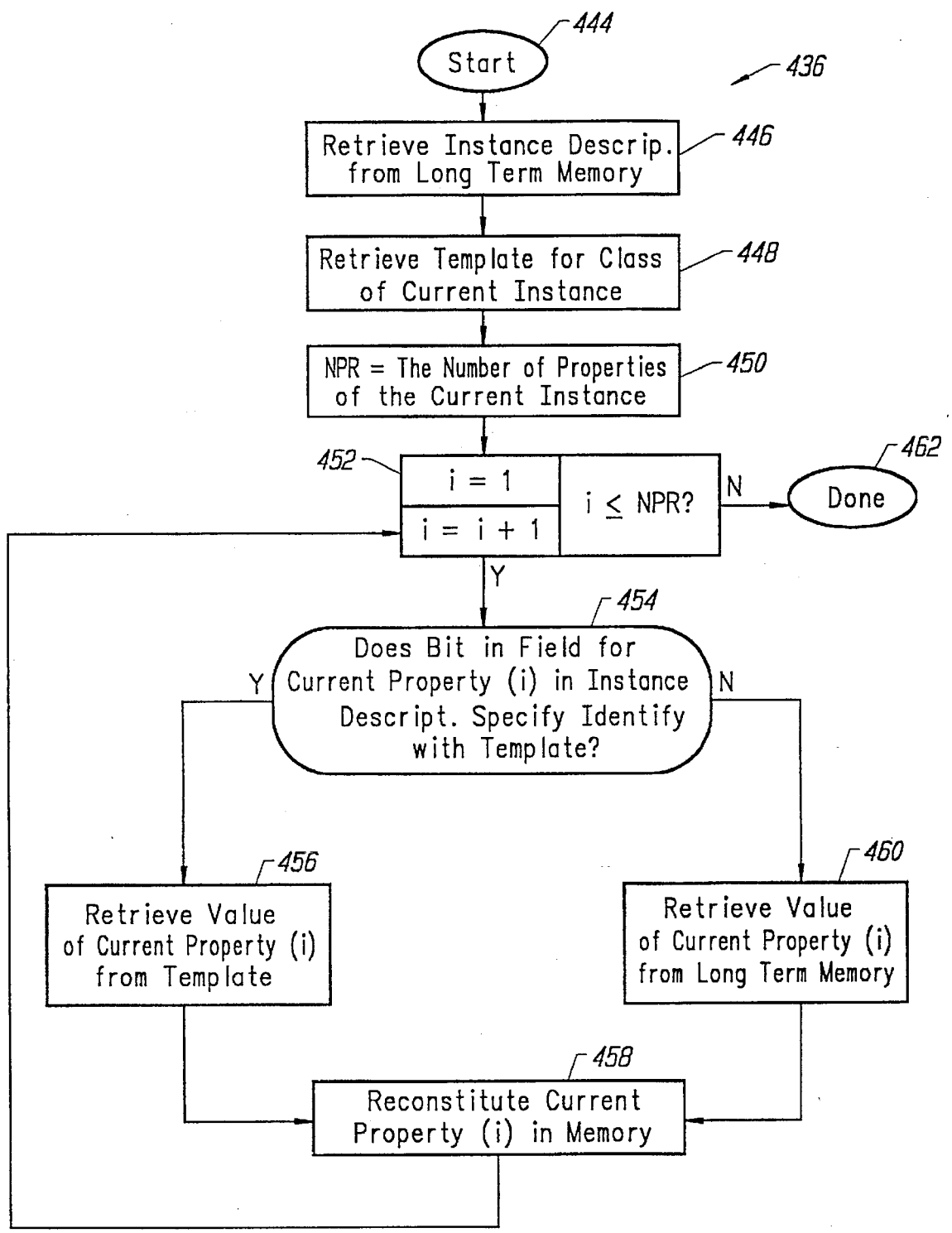
FIG. 12 is a process flow diagram detailing the steps employed to reconstitute a persistent instance from a representation of that instance stored in long term memory.

The POSM 336 is responsible for implementing a virtual memory method employed to store persistent instances in a compressed form. This method is detailed in the flow charts of FIGS. 8–12. FIGS. 8–10 depict the process in which persistent instances are stored to long term memory while FIGS. 11–12 depict the processes by which persistent instances are retrieved from long term memory.

Referring first to FIG. 8, the process for storing persistent instances begins at 344 and proceeds to a process step 346 where a new persistent instance is registered. This simply indicates that a persistent instance generated by interpreter 328 is routed to POSM 336. Thereafter, the POSM creates a unique identifier for the new persistent instance at a step 348. This unique identifier is then stored in a memory table together with the memory location of the persistent instance at a process step 350. It should be noted that the term "memory" as used hereinafter generally refers to a volatile or temporary memory (e.g., RAM). In contrast, the term "long term memory" refers to a non-volatile storage media such as a hard disk drive. It should also be noted that in the subsequently described methods, the unique identifier of an instance remains the primary reference to that instance throughout its existence in a report object.

As reports are often very large, it is necessary to periodically offload some persistent instances from memory and begin the process of building the report object. Thus, after the memory table has been updated at process step 350, a decision step 352 determines whether the memory currently contains more than a preset maximum number of persistent instances. If not, a process step 354 determines whether any additional persistent instances must be registered to complete the report object. If so, process control is returned to step 346 which registers the next persistent instance.

Assuming that decision step 352 is answered in the affirmative (i.e., there are more than a preset maximum number of instances in memory), a process step 358 identifies those persistent instances to be stored in long term memory. This may be done by a variety of mechanisms, but preferably some heuristics are provided to remove "older" persistent instances currently in memory. After the instances to be removed have been identified at step 358, the system begins the process of sequentially loading those instances to long term memory. This involves first setting the value of a parameter NOB at step 360 which specifies the number of persistent objects to be stored for long term memory (i.e., the number of objects identified at step 358).

Next, an iterative loop step 362 initializes an "instance counter" i to 1 and then determines whether the current value of i is less than of equal to NOB. Assuming that i is less than or equal to NOB, a process step 364 then loads the current persistent instance (i.e., the instance corresponding to the current value of the instance counter) into long term memory. For housekeeping purposes, a process step 366 then removes the entry for the current persistent instance from the memory table. Process control then returns to iterative loop step 362 where an incrementer increments the value of i by 1. The value of i is again compared with NOB, and if it remains less than NOB, the next persistent instance is loaded into long term memory and its entry removed from the memory table at process steps 364 and 366 as described above.

After all of the "older" persistent instances identified for storage in long term memory (at step 358) have, in fact, been loaded to long term memory, iterative loop step 362 must be answered in the negative. That is, i is found to be greater than NOB. Thereafter, process control is directed to decision step 354 which again determines whether there are more persistent instances to be registered. If so, process control then returns to process step 346 as described before. At some point, however, no further persistent objects are generated, and therefore decision step 354 must be answered in the negative. At that point, a process step 368 stores the persistent instances remaining in memory to long term memory. This accomplished by essentially repeating process steps 364 and 366 for each instance remaining in memory. Thereafter, the process is completed at 370.

FIG. 9 depicts the process steps which are important in loading a current persistent instance to long term memory (i.e., step 364 of FIG. 8). This process is rather important, as it allows the persistent objects to be stored in compressed form. The process begins at 380 and then a decision step 382 determines of whether the current instance is the first instance of its object class to be stored in long term memory. If so, a process step 384 generates a class reference template specifying the properties of the current instance. As explained above, in connection with the physical file format of a report object (FIG. 5), templates are used to specify a storage format for each persistent instance. After the referenced template has been generated at step 384, a process step 386 specifies a persistent instance description having a field for each property of the current instance. This is simply the body 208 described with reference to FIG. 5. It should be noted that if decision step 382 is answered in the negative, process control passes directly to step 386 without generating a new template at step 384. It should also be noted that although this process employs the first instance of a given class to define the template for that class, other mechanisms could be employed to specify the contents of a reference template. For example, the reference template for each class might be set by default before any persistent objects are generated, or it might be generated based upon how frequently particular properties of a given class appear.

Regardless of how the template is obtained, it is used to generate a compressed form of the persistent instance that is stored in long term memory. This process is accomplished beginning at a step 388 in which a variable NPR is set equal to the number of properties of the current instance. Then an iterative loop step 390 initializes a "property counter" i to 1 and compares the current value of i to NPR. Assuming that i is less than or equal to the value of NPR (as it would be on the first go round), a decision step 392 then determines whether the value of the current property (in the current instance) is equal to that of the corresponding property in the template. Assuming that it is, a process step 394 sets a bit in the instance description to indicate identity with the template for the current property. Thus, only a single bit is employed to specify the value of a particular property—representing a substantial savings in storage space.

After the bit has been set in process step 394, process control returns to iterative loop step 390 where the property counter i is incremented by 1 and then compared with the value of NPR. Assuming that the value of i remains less than NPR, process control again returns to decision step 392. Assuming that decision step 392 is answered in the negative, a process step 396 stores the value of the current property in the instance description. Then, a process step 398 sets a bit in the instance description to indicate that the value of that property is different from the value specified in the corresponding template. Thereafter, process control returns to iterative loop step 390 which operates as described above. After all properties of the current instance have been evaluated and properly specified in the instance description, the NPR comparator in iterative loop 390 will be answered in the negative. At that point, a process step 400 stores the persistent instance description to long term memory and stores a reference to the location of that instance in the header of the report object file.

Process step 400 will now be described in more detail with reference to FIG. 10. The process begins at 408 and then a decision step 410 determines whether the current instance has previously been written to long term memory. If not, a process step 412 then identifies a new storage location in long term memory and a process step 414 writes that location to the header of the persistent report object file. Thereafter, a process step 416 writes the current instance description to the storage location specified above, and the process is completed at 420.

Assuming that decision step 410 is answered in the affirmative, a decision step 418 then determines whether the space to be occupied by the current version of the instance is larger than the space now occupied by the previously stored version of the instance. If it is determined that the current version is smaller than the previously stored version, the system simply writes the storage location to the header of the persistent report object file at process step 414. The process is then concluded at steps 416 and 420 as described above. If, however, it is determined that the current version of the instance is in fact larger than the previously stored version of the instance, process control is directed to step 412 where a new storage location is identified. Thereafter, the process continues through steps 414, 416, and 420 as described above.

Now, with reference to FIG. 11, a process for retrieving an instance stored in long term memory will be described. It should be noted that this process typically is employed when a report is to be visualized and/or searched, but it may also be employed when an instance must be generated two or more times during creation of the report object. The process begins at 426 and in a process step 428, the system receives the unique identifier for the persistent instance to be retrieved. Next, a decision step 430 determines whether the unique identifier is currently in the memory table. If so, the instance can be retrieved directly from memory as the relevant memory address is returned at a process step 432. The process is then concluded at 440.

Assuming, in contrast to the above scenario, that the unique identifier for the persistent instance to be retrieved is not in the memory table (i.e., decision step 430 is answered in the negative), then a process step 434 reads the header of the report object file from long term memory to locate the persistent instance description. Thereafter, a process step 436 reconstitutes, in memory, the persistent instance corresponding to the located persistent instance description. Next, a process step 438 adds the unique identifier and memory location of the persistent instance to the memory table. The memory address of the persistent instance is then returned at step 432 as described above and process is completed at 440.

The process by which a persistent instance is reconstituted in memory (process step 436 of FIG. 11) is detailed in FIG. 12. The process begins at 444, and then in a process step 446, the instance description is retrieved from long term memory. Next, a process step 448 retrieves the template for the class of the current instance. At this point, all data necessary for reconstitution is available.

At a process step 450, the variable NPR is set equal to the number of properties that must be specified for current instance's class. Next, an iterative loop step 452 sets a property counter i equal to 1 and determines whether the current value of i is less than or equal to the value of NPR. Assuming that step 452 determines that i is less than or equal to the value of NPR, a decision step 454 determines whether the bit in the field for the current property in the instance description specifies that that property is identical with the property of the template. Assuming that decision step 454 is answered in affirmative, a process step 456 retrieves the value of the current property from the template, and the current property is reconstituted in memory at a process step 458. Thereafter, process control returns to iterative loop step 452 where the counter i is incremented by 1 and compared with the value of NPR.

If decision step 454 is answered in the negative (i.e., the current property of the current instance is not equal with the corresponding property of the template), a process step 460 retrieves the value of the current property from long term memory. Then, the current property is reconstituted in memory at step 458 as described above. After all properties of the current instance have been reconstituted as described, and the value of i is no longer less than or equal to the value of NPR, the process is concluded at 462.

6. A REPORT OBJECT CLASS LIBRARY

Figure 13:
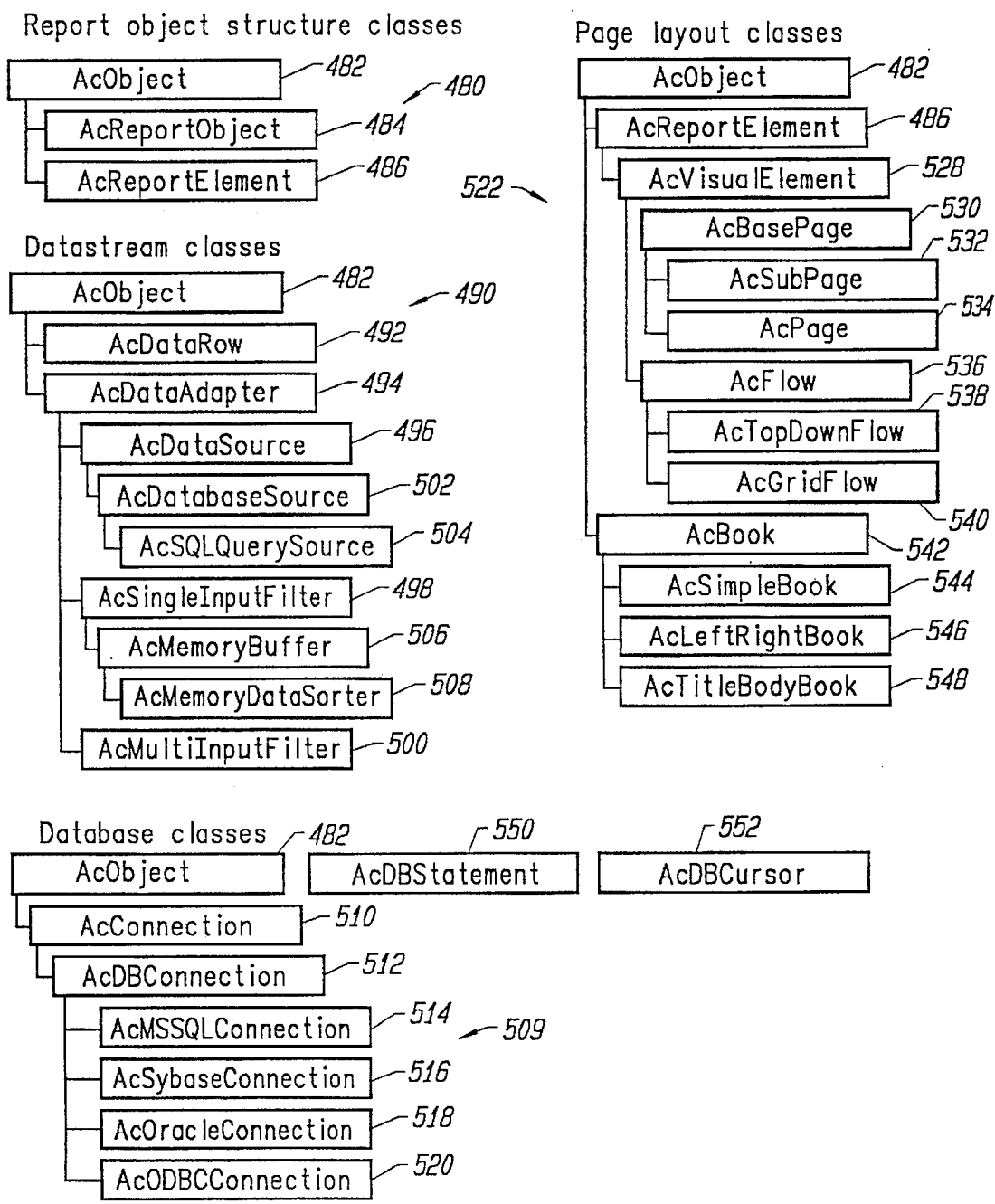
FIG. 13 is a block diagram showing hierarchies of foundation classes used in a preferred embodiment of the present invention.
Figure 14:
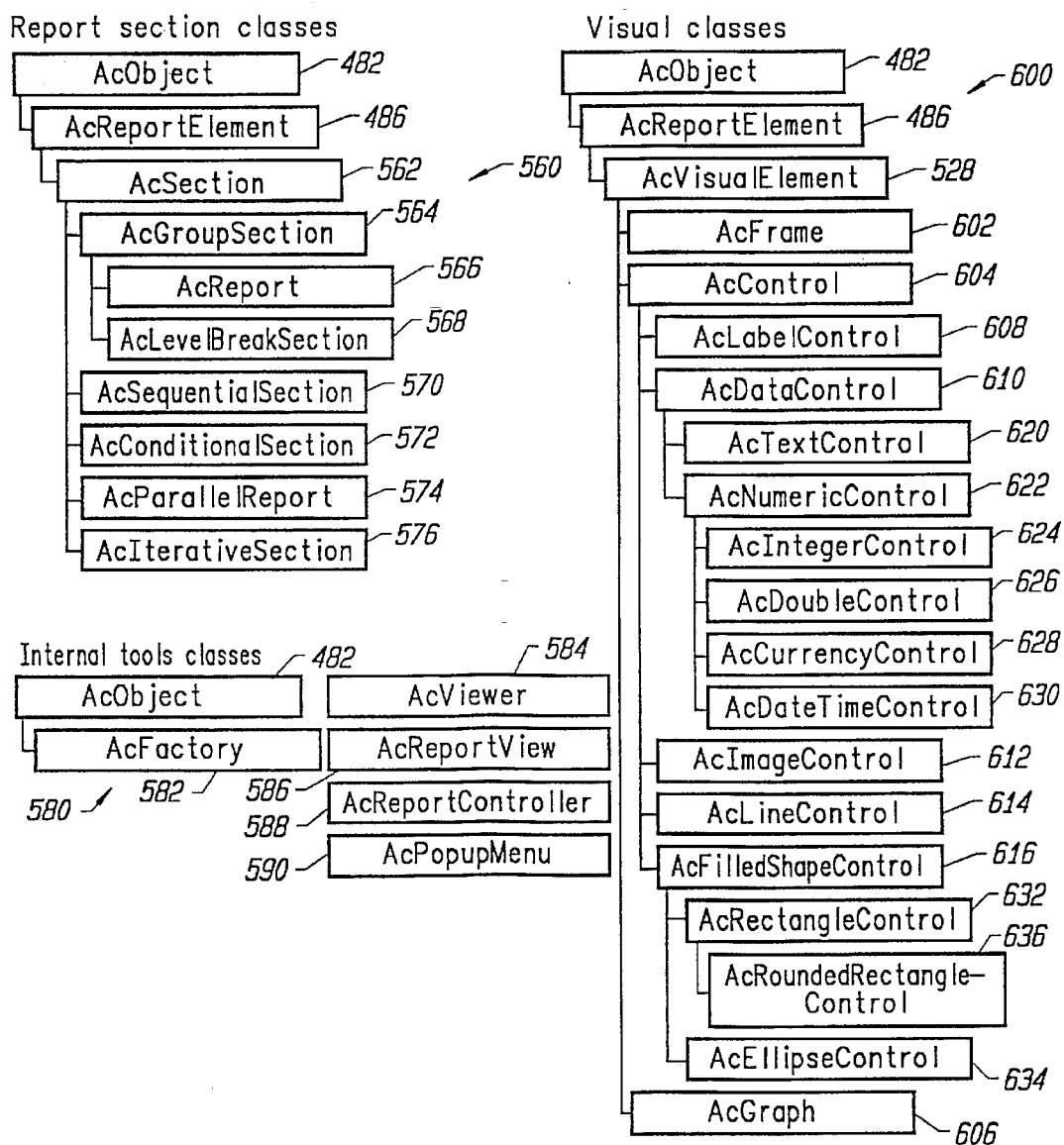
FIG. 14 is a block diagram showing hierarchies of additional foundation classes used with those shown in FIG. 13.

As explained above, the invention employs a class library to generate the report objects described herein. FIG. 7, for example, illustrates the role of a class library 324. FIGS. 13 and 14 illustrate hierarchies of foundation classes employed in a preferred embodiment of the present invention. Their associated roles in a report object are indicated in the source code appendix to this document.

As shown, an Object class 482 is a parent class for all other classes in the class library. A hierarchy of report object structure classes 480 includes ReportObject class 484 and ReportElement class 486 as subclasses of Object class 482. The ReportObject class 484 is the mot of both the data hierarchy and the display hierarchy. The data hierarchy is a tree of frame records that correspond to data obtained from data streams which is then grouped by level breaks (see FIG. 4). The display hierarchy is a list of pages containing flows which contain frames which contain controls (see FIG. 3). The ReportElement class 486 is the element of persistent storage for the report object. All persistent report objects derive from this class. It provides the hierarchical parent/child structure common to the content and layout hierarchies. It also forms the base class for all sections, reports, frames, and controls that make up a report object. To allow these components to be interchangeable, this class provides a common protocol that they all follow in the during report object creation (step 276 of FIG. 6) and viewing.

A "datastream classes" hierarchy 490 includes a DataRow class 492 and a DataAdapter class 494 as subclasses of Object class 482. The DataRow class 492 is a base class for user-defined data rows provided in report object. The DataAdapter class 494 is the base class for all classes that get data rows from outside the report application, or that do processing on data rows. There are two main kinds of data adapters. Data sources get data from an outside source or create it. Data filters process data rows produced by other data falters or by a data source. Data adapters can be connected together to form a data pipeline; the output of one data adapter is connected to the input of another data filter. The entire collection of connected data adapters is called the "data stream."

A DataSource class 496, a SingleInputFilter class 498, and a MultiInputFilter class 500 are all subclasses of the DataAdapter class 494. DataSource class 496 is a base class for all data adapters which read rows from an input source. It provides a mechanism for creating new data row instances for each input record read. SingleInputFilter class 498 is a base class for data filters that accept one input and do processing on each row. MultipleInputFilter class 500 is a base class for data filters that accept any number of inputs and do processing on each row.

A DatabaseSource class 502 is a subclass of DataSource class 496, and a SQLQuerySource 504 is, in turn, a subclass of DatabaseSource class 502. The DatabaseSource class 502 is a base class for data sources that work with a database. It provides a connection to a database connection. The SQLQuerySource 504 is a base class for data sources that represent result sets from a SQL query. This class maintains pointers to the statement and cursor for the query.

A MemoryBuffer class 506 is a subclass of the SingleInputFilter class 498, and a MemoryDataSorter class 508 is, in turn, a subclass of the MemoryBuffer class 506. The MemoryBuffer class 506 is data filter which buffers its rows in memory and allows the client to rewind to any number of rows. The client always deals with either an absolute row number, or a position relative to the current position. This class translates these numbers into indexes into the buffer array. To save memory, it provides a "flush" feature to discard rows that are no longer needed. The MemoryDataSorter class 508 is a data filter which sorts rows in memory.

Next, a "database classes" hierarchy 509 includes a Connection class 510 as a subclass of Object class 482, and a DBConnection class 512 which is, in turn, a subclass of Connection class 510. The Connection class 510 is an abstract base class that models a generic connection. It forms a Basic wrapper around the actual connection interface in C++. The DBConnection class 512 is an abstract base class that establishes a data base connection. It has derived subclasses specific to each supported vendor. This class also establishes a Basic wrapper around the actual connection interface in C++.

Four different classes form subclasses of DBConnection class 512. These are MSSQL connection class 514, SybaseConnection class 516, OracleConnection and a ODBC Connection class 520. Each of these classes provides a connection to specific data base. Typically, a user ID, a server name, a password, etc. must be specified as appropriate for the particular data base.

Other "database classes" include a DBStatement class 550 and a DBCursor class 552. The DBStatement class 550 provides a Basic interface to a SQL statement. This class provides a Basic wrapper around the actual SQL statement interface in C++. The DBCursor class 552 provides a Basic interface to a data base cursor for a SQL statement. It also provides a Basic wrapper around the actual statement interface C++.

Next, a "page layout classes" hierarchy 522 includes classes relevant to the display of the report. As shown, ReportElement class 486 and a Book class 542 are subclasses of the parent Object class 482. As noted above, all persistent report objects derive from the ReportElement class 486. In hierarchy 522, the ReportElement class 486 includes as subclasses a VisualElement class 528 which provides visual objects including flames and controls.

A BasePage class 530 and a Flow class 536 are subclasses of the VisualElement class 528. The BasePage class 530 is an ancestor of both pages and subpages. Thus, BasePage 530 has as subclass a SubPage class 532 and a Page class 534. The Page class 534 describes one printed page including a trim, flows, etc. The SubPage class 532 describes a "SubPage" which acts just like a page in that it has a trim, flows, etc. However, unlike a page, a subpage can grow or shrink vertically and must appear inside a flow on another page or subpage.

The flow class 536 has as subclasses a TopDownFlow class 538 and a GridFlow class 540. The Flow class 536 describes a "printable area" on a page. The TopDownFlow class 538 places frames in flow from top to bottom.

The Book class 542 includes as subclasses a SimpleBook class 544, a LeftRightBook class 546, and a TitleBodyBook class 548. The Book class 542 serves to create and hold the pages for a given report. The SimpleBook 544 creates a series of body pages all on the same style for use of the book. The LeftRightBook class 546 creates book having alternating left-right pages. Finally, the TitleBodyBook class 548 creates a book having a title page followed by alternating left-right pages.

Turning now to FIG. 14, a "report section" class/subclass hierarchy 560 is displayed. This hierarchy 560 shows a Section class 562 as a subclass of the ReportElement class 486. The Section class 562 is the base class for all sections. Sections that work with a data stream are called reports. Those that work with rows created by another report are called nested sections. This class encapsulates behavior common to both of the these kinds of sections. A GroupSection class 564 is a subclass of Section class 562. GroupSection class 564 is the base class for Sections that follow a format which specifies section information in the following order: before, content, and after. This class has two subclasses, a Report class 566 and a LevelBreakSection class 568. The Report class 566 handles the interface to a data stream for simple reports. It opens, reads from, and closes the steam. The logical report delegates to a list of sections the work of processing each data row from the data stream. The LevelBreakSection 568 is used to represent each level in a report. There is a section for the report as a whole, for each level break, and for each data row. The nature of level breaks were discussed in detail above.

Other subclasses from Section class 562 include a SequentialSection class 570, a ConditionalSection class 572, a ParallelReport class 574, and IterativeSection report 576. The SequentialSection class 570 provides sections that specify a series of nested sections. Typically, these sections will be displayed sequentially in the report. In contrast, the ParallelReport class 574 provides for reports that run a number of sections in parallel and directs them into different flows on the same page. The ConditionalSection class 572 provides sections that conditionally choose one of several content items. Finally, the IterativeSection class 576 specifies sections that are generated according to an iterative loop routine.

Next, an "internal tools" class hierarchy 580 includes a "Factory" class 582 and a subclass of Object class 482. The Factory class 582 encapsulates the high-level tasks of creating the report Object (step 276 of FIG. 6).

In addition, the internal tools classes 580 include a Viewer class 584, a ReportView class 586, a ReportController class 588 and a Pop-upMenu class 590. The Viewer class 584 is an abstraction for viewing reports as a whole. The Viewer can have any number of views (normally one) open on a report Object. The ReportView class 586 provides a visual view of a report object. There can be many such views for the same object open at once. The ReportController class 588 is used by Basic to send commands to an entire report object instance. The instance being controlled can either be one in which the program is executing (to generate the report object) or another in the viewer mode. Finally, the Pop-upMenu class 590 provides a menu class on top of the pop-up menu functions provided by Basic.

The final class/subclass hierarchy is the "visual classes" hierarchy 600 shown in FIG. 14. As shown, below the VisualElement class 528 are three subclasses: Frame class 602, Control class 604, and Graph class 606. The Frame class 602 is the base class for all frames, including frames in pages, flows, subpages, and data frames. The Graph class 606 provides classes that interface with a particular third-party graphics server.

The Control class 604 is the base class for all controls. It includes as direct subclasses a LabelControl class 608, a DataControl class 610, an ImageControl class 612, a LineControl class 614, and FilledShapeControl 616. The LabelControl class 608 provides simple text control for static labels. The ImageControl class 612 provides simple bit map control. The line control class 614 provides a control that represents lines. Such lines are defined by a style, an anchor point, a width, etc.

The data control class 610 provides a control which displays data from the data base. It has as direct subclasses a TextControl class 620 and NumericControl class 622. The TextControl class 620 provides justified text control. The NumericControl class 622 provides an abstract subclass for various numeric controls. These numeric controls are provides by subclasses including an IntegerControl class 624, a DoubleControl class 626, a CurrencyControl class 628, and a DateTimeControl class 630. The IntegerControl class 624 provides controls containing an integer number. The DoubleControl class 626 provides controls containing a double precision floating point number. The CurrencyControl class 628 provides controls containing a currency number. Finally, the DateTimeControl class 630 provides controls containing a date and a time.

The FilledShapeControl class 601 provides controls having various filled shapes. It has as subclasses a RetangleControl class 632 and an EllipseControl class 634. The RectangleControl class 632 has a subclass a RoundedRectangleControl class 636.

Although the foregoing invention has been described in some detail for purposes of clarity of understanding, it will be apparent that certain changes and modifications may be practiced within the scope of the appended claims. For instance, although the specification has described an example employing report objects representing a single report, other report objects representing multiple reports may be used as well. In addition, in some embodiments it will be desirable to employ multiple level break hierarchies in the same report. In addition, the reader will understand that the report objects described herein can be used in contexts other than sales reports. For example, the report objects here taught may be used with employment reports, scientific reports, etc. and their equivalents.

What is claimed is:

1. A method for creating a report object that contains information for displaying and searching a report, the method comprising the following steps:

(a) identifying data to be put into the report object;

(b) providing a report design specifying how the data identified in step (a) is (i) logically arranged into a hierarchy having section breaks between members of a first group of report entities, and (ii) visually arranged in frames on a display medium;

(c) generating instances of object classes from a report object class library and the report design, which instances and classes define a visual organization and content of the report;

(d) persistently storing the instances of the object classes in a form that preserves the hierarchy provided in step (b), wherein the report object includes the instances stored.

2. The method of claim 1 wherein the step of providing a report design specifies that the section breaks include level breaks between members of a first group of report entities.

3. The method of claim 2 wherein the step of providing a report design provides a logical arrangement in which the level breaks reference said frames and reference one or more additional level breaks between members of a second group of report entities.

4. The method of claim 1 wherein the step of generating instances of object classes generates such instances from object classes selected from the group consisting of a frame class for specifying regions of the report where specified data is displayed, a flow class for specifying regions of a page where frames may be provided, and a level break class for specifying the data associated with a level of the report.

5. The computer system of claim 1 wherein in said step of providing a report design, the report design is generated with the aid of a graphical user interface having user interface tools allowing users to design reports.

6. The method of claim 1 wherein the step of persistently storing the instances of the object classes includes a step of compressing the instances.

7. A computer readable medium storing instructions for creating a report object that contains information for displaying and searching a report, the medium including instructions for performing the following steps:

(a) identifying data to be put into the report object;

(b) providing a report design specifying how the data identified in step (a) is (i) logically arranged into a hierarchy having section breaks between members of a first group of report entities, and (ii) visually arranged in frames on a display medium;

(c) generating instances of object classes from a report object class library and the report design, which instances and classes define a visual organization and content of the report;

(d) persistently storing the instances of the object classes in a form that preserves the hierarchy provided in step (b), wherein the instances stored define the report object.

8. The computer readable medium of claim 7 wherein the step of providing a report design specifies that the section breaks include level breaks between members of a first group of report entities.

9. The computer readable medium of claim 7 wherein the step of providing a report design provides a logical arrangement in which the level breaks reference said frames and reference one or more additional level breaks between members of a second group of report entities.

10. The computer readable medium of claim 7 wherein the step of generating instances of object classes generates such instances from object classes selected from the group consisting of a frame class for specifying regions of the report where specified data is displayed, a flow class for specifying regions of a page where frames may be provided, and a level break class for specifying the data associated with a level of the report.

11. The computer readable medium of claim 7 wherein in said step of providing a report design, the report design is generated with the aid of a graphical user interface having user interface tools allowing users to design reports.

12. The computer readable medium of claim 7 wherein the step of persistently storing the instances of the object classes includes a step of compressing the instances.

13. A method of compressing and persistently storing a report object in long term memory associated with a computer system, the report object containing an object-oriented representation of a report having level breaks, the method comprising the following steps:

in a process for generating the report object from instances of multiple report object classes, identifying a persistent instance and its corresponding report object class, which persistent instance is to be stored to long term memory;

providing a template specifying a property value for each of one or more instance properties associated with instances of the corresponding report object class;

providing a description of the persistent instance, the description having a description field for each of the one or more instance properties;

for each property value of said template, determining whether a corresponding instance property of the persistent instance matches the property value specified in the template;

when, for a given instance property of the persistence instance, the template property value matches the instance property, providing the description field corresponding to the given instance property with a first identifier chosen to indicate that the template property value matches the persistent instance; and storing the description of the persistent instance in long term memory.

14. The method of claim 13 wherein the first identifier is a single bit.

15. The method of claim 13 further comprising the following step:

for any property value specified in the template that does not match the corresponding instance property of the persistent instance, providing the description field corresponding to any unmatched instance property with a second identifier chosen to indicate that the property values of the template and the persistent instance do not match.

16. The method of claim 15 wherein the first identifier is a single bit of a first value, and the second identifier is a single bit of a second value which is different from that the first value.

17. The method of claim 13 wherein the corresponding report object class identified in the step of identifying a persistent instance and its corresponding report object class is selected from the group consisting of a frame class for specifying regions of the report where specified data is displayed, a flow class for specifying regions of a page where frames may be provided, and a level break class for specifying the data associated with a level of the report.

18. The method of claim 13 wherein multiple persistent instances of the corresponding report object class are identified, and wherein, in the step of providing a template, the instance properties of a first identified persistent instance are used to specify the template property value for each of one or more instance properties associated with instances of the report object class.

19. The method of claim 13 further comprising a step of recording a storage location for the description of the persistent instance in long term memory after said step of storing the description of the persistent instance.

20. The method of claim 13 further comprising a step of determining whether a volatile memory associated with said computer system includes more than a predefined maximum number of persistent instances, such that when the predefined maximum number is exceeded, the step of identifying a persistent instance to be stored to long term memory is performed.

21. A computer system for compressing and persistently storing a report object in long term memory associated with the computer system, the report object containing an object-oriented representation of a report having level breaks, the computer system comprising:

a central processing unit in communication with a volatile memory;

a class library at least partially stored on the long term memory or the volatile memory, the class library including a collection of report object classes for defining visual and logical features of a report; and a persistent object storage manager implemented on said central processing unit and said volatile memory, the persistent object storage manager compressing and persistently storing persistent instances of said report object classes, said persistent object storage manager including:

means for comparing a first persistent instance of a first report object class with a template for said first report object class, which template specifies a property value for each of one or more instance properties associated with instances of the first report object class;

means for generating a description of the first persistent instance based upon a comparison of the template with the first persistent instance, whereby the means for generating provides (i) a first identifier in said description for those instance properties in which the template property matches the instance property of the persistent instance, and (ii) a second identifier in said description for those instance properties in which the template property does not match the instance property of the persistent instance, and means for storing the description of the first persistent instance to long term memory in a persistent report object file.

22. The computer system of claim 21 further comprising a means for generating said persistent instances of the report object classes from said class library and from a specified report design.

23. The computer system of claim 22 wherein the a means for generating persistent instances includes (i) an object generating program for encoding an object-oriented description of the report, and (ii) an interpreter for interpreting said object oriented description to generate said persistent instances of report object classes.

24. The computer system of claim 23 wherein said interpreter generates temporary instances in addition to said persistent instances, said temporary instances assisting the generation and organization of said persistent instances.

25. The computer system of claim 22 further comprising a graphical user interface having user interface tools allowing users to design reports, whereby the graphical user interface provides the specified report design.

26. The computer system of claim 21 wherein the class library includes one or more classes selected from the group consisting of frame classes for specifying regions of the report where specified data is displayed, flow classes for specifying regions of a page where frames may be provided, and level break classes for specifying the data associated with a level of the report.

27. The computer system of claim 21 wherein the description of the first persistent instance includes a description field for each of the one or more instance properties.

28. The computer system of claim 21 wherein the first identifier is a first value of a single bit and the second identifier is a second value of the single bit.

29. A computer readable medium storing instructions for compressing and persistently storing a report object in long term memory, the report object containing an object-oriented representation of a report having level breaks, the medium including instructions for performing the following steps:

in a process for generating the report object from instances of multiple report object classes, identifying a persistent instance and its corresponding report object class, which persistent instance is to be stored to long term memory;

providing a template for instances of the corresponding report object class, the template specifying a property value for each of one or more instance properties associated with instances of the corresponding report object class;

providing a description of the persistent instance, the description having a description field for each of the one or more instance properties;

for each property value of said template, determining whether a corresponding instance property of the persistent instance matches the property value specified in the template;

when, for a given instance property of the persistence instance, the template property value matches the instance property, providing the description field corresponding to the given instance property with a first identifier chosen to indicate that the template property value matches the persistent instance; and storing the description of the persistent instance in long term memory.

30. The computer readable medium of claim 29 wherein the first identifier is a single bit.

31. The computer readable medium of claim 29 further comprising instructions for performing the following step:

for any property value specified in the template that does not match the corresponding instance property of the persistent instance, providing the description field corresponding to any unmatched instance property with a second identifier chosen to indicate that the property values of the template and the persistent instance do not match.

32. The computer readable medium of claim 31 wherein the first identifier is a single bit of a first value, and the second identifier is a single bit of a second value which is different from that the first value.

33. The computer readable medium of claim 29 wherein the corresponding report object class identified in the step of identifying a persistent instance and its corresponding report object class is selected from the group consisting of a frame class for specifying regions of the report where specified data is displayed, a flow class for specifying regions of a page where frames may be provided, and a level break class for specifying the data associated with a level of the report.

34. The computer readable medium of claim 29 wherein multiple persistent instances of the corresponding report object class are identified, and wherein, in the step of providing a template, the instance properties of a first identified persistent instance are used to specify the template property value for each of one or more instance properties associated with instances of the report object class.

35. The computer readable medium of claim 29 further comprising instructions for performing a step of recording a storage location for the description of the persistent instance in long term memory after said step of storing the description of the persistent instance.

36. The computer readable medium of claim 29 further comprising instructions for performing a step of determining whether a volatile memory associated with said computer system includes more than a predefined maximum number of persistent instances, such that when the predefined maximum number is exceeded, the step of identifying a persistent instance to be stored to long term memory is performed.

* * * * *